(12) United States Patent
Song et al.

(10) Patent No.: US 10,860,808 B2
(45) Date of Patent: *Dec. 8, 2020

(54) METHOD AND SYSTEM FOR GENERATION OF CANDIDATE TRANSLATIONS

(71) Applicant: Alibaba Group Holding Limited, Grand Cayman (KY)

(72) Inventors: Kai Song, Hangzhou (CN); Weihua Luo, Hangzhou (CN); Feng Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 2 days.

This patent is subject to a terminal disclaimer.

(21) Appl. No.: 16/267,207

(22) Filed: Feb. 4, 2019

(65) Prior Publication Data

US 2019/0171720 A1  Jun. 6, 2019

Related U.S. Application Data

(63) Continuation of application No. 15/247,690, filed on Aug. 25, 2016, now Pat. No. 10,255,275.

(30) Foreign Application Priority Data

Aug. 25, 2015  (CN) .......................... 2015 1 0527159

(51) Int. Cl.
*G06F 17/26* (2006.01)
*G06F 40/44* (2020.01)
(Continued)

(52) U.S. Cl.
CPC ............ *G06F 40/44* (2020.01); *G06F 40/205* (2020.01); *G06F 40/30* (2020.01); *G06F 40/55* (2020.01)

(58) Field of Classification Search
None
See application file for complete search history.

(56) References Cited

U.S. PATENT DOCUMENTS 4,905,188 A  2/1990 Chuang et al.
5,418,922 A  5/1995 Liu
(Continued)

FOREIGN PATENT DOCUMENTS

CN  101079028 A  11/2007
CN  102214166 A  10/2011
(Continued)

OTHER PUBLICATIONS

Translation of Chinese Office Action from corresponding Chinese Patent Application No. 2015105271593, dated Sep. 29, 2018, 16 pages.
(Continued)

*Primary Examiner* — Satwant K Singh
(74) *Attorney, Agent, or Firm* — Lee & Hayes, P.C.

(57) ABSTRACT

Implementations herein relate to methods and devices for generating candidate translations and for quantizing text as well as words. A method may include generating, by a computing device, pending candidate translations of text to be translated based on predetermined translation rules. The computing device may generate translation probabilities from the text to be translated to the pending candidate translations based on features having impacts on translation probabilities of the pending candidate translations and a predetermined translation probability prediction model. The computing device may then select a predetermined number of pending candidate translations that have the translation probabilities higher than other pending candidate translations in the pending candidate translations to be the candidate translations of the text to be translated. In implementations, the features having impacts on the translation
(Continued)

probabilities may include degrees of semantic similarity between the text to be translated and the candidate translations.

16 Claims, 22 Drawing Sheets

(51) Int. Cl.
*G06F 40/30* (2020.01)
*G06F 40/55* (2020.01)
*G06F 40/205* (2020.01)

(56) References Cited

U.S. PATENT DOCUMENTS

| | | | |
|---|---|---|---|
| 5,664,154 | A | 9/1997 | Purcell et al. |
| 5,768,603 | A | 6/1998 | Brown et al. |
| 5,845,323 | A | 12/1998 | Roberts et al. |
| 6,065,101 | A | 5/2000 | Gilda |
| 6,138,213 | A | 10/2000 | McMinn |
| 7,113,903 | B1 | 9/2006 | Riccardi et al. |
| 7,454,326 | B2 | 11/2008 | Marcu et al. |
| 7,533,013 | B2 | 5/2009 | Marcu |
| 7,698,124 | B2 | 4/2010 | Menezes et al. |
| 8,099,376 | B2 | 1/2012 | Serrano-Morales et al. |
| 9,002,696 | B2 * | 4/2015 | Kraenzel .............. G06F 40/51 704/2 |
| 9,317,501 | B2 * | 4/2016 | Kraenzel .............. G06F 40/51 |
| 9,471,883 | B2 * | 10/2016 | Chatterjee .............. G06F 16/93 |
| 10,255,275 | B2 * | 4/2019 | Song .............. G06F 40/44 |
| 10,268,685 | B2 * | 4/2019 | Zeng .............. G06F 40/44 |
| 10,268,686 | B2 | 4/2019 | Eck et al. |
| 10,380,264 | B2 | 8/2019 | Lee |
| 10,460,038 | B2 | 10/2019 | Eck et al. |
| 2006/0265209 | A1 | 11/2006 | Bradford |
| 2007/0186073 | A1 | 8/2007 | Luick |
| 2008/0154577 | A1 | 6/2008 | Kim et al. |
| 2009/0083023 | A1 | 3/2009 | Foster et al. |
| 2009/0248422 | A1 | 10/2009 | Li et al. |
| 2009/0326912 | A1 | 12/2009 | Ueffing |
| 2010/0179803 | A1 | 7/2010 | Sawaf et al. |
| 2014/0163951 | A1 * | 6/2014 | Nikoulina .............. G06F 40/42 704/4 |
| 2014/0207439 | A1 | 7/2014 | Venkatapathy et al. |
| 2014/0229158 | A1 | 8/2014 | Zweig et al. |
| 2014/0350914 | A1 | 11/2014 | Andrade Silva et al. |
| 2016/0085748 | A1 | 3/2016 | Goto |
| 2016/0179790 | A1 | 6/2016 | Watanabe et al. |
| 2017/0060854 | A1 | 3/2017 | Zeng et al. |
| 2017/0060855 | A1 | 3/2017 | Song et al. |
| 2019/0197118 | A1 | 6/2019 | Zeng et al. |

FOREIGN PATENT DOCUMENTS

| | | |
|---|---|---|
| CN | 104391842 A | 3/2015 |
| CN | 104778158 A | 7/2015 |
| EP | 0570660 B1 | 11/1997 |
| JP | 2001273293 A | 10/2001 |
| JP | WO2015029241 A1 | 3/2015 |
| WO | WO9708604 A2 | 3/1997 |

OTHER PUBLICATIONS

Translation of Chinese Search Report from corresponding Chinese Patent Application No. 2015105271593, dated Sep. 19, 2016, 2 pages.
Translation of Search Report from corresponding Chinese Patent Application No. 2015105277458, dated Sep. 26, 2018, 2 pages.
Office action for U.S. Appl. No. 15/247,690, dated Jun. 1, 2018, Song, "Method and system for generation of candidate translations", 6 pages.
Office action for U.S. Appl. No. 15/247,490, dated Jul. 11, 2018, Zeng, "Statistics-Based Machine Translation Method, Apparatus and Electronic Device", 13 pages.
PCT Invitation to Pay Additional Fees dated Oct. 21, 2016 for PCT Application No. PCT/US16/48722, 2 pages.
PCT Invitation to Pay Additional Fees from corresponding PCT application No. PCT/US16/48751, dated Oct. 7, 2016, 2 pages.
PCT Invitation to Pay Additional Fees dated Dec. 30, 2016 for PCT Application No. PCT/IB2016/001563, 2 pages.
PCT Search Report and Written Opinion dated Jan. 12, 2017 for PCT Application No. PCT/US16/48751, 13 pages.
PCT Search Report and Written Opinion dated Mar. 10, 2017 for PCT application No. PCT/IB16/01563, 15 pages.
Non Final Office Action dated Jan. 9, 2020 for U.S. Appl. No. 16/286,444 "Statistics-based Machine Translation Method, Apparatus and Electronic Device"Zeng, 5 pages.

* cited by examiner

```
┌─────────────────────────────────────────────┐
│ Parse the text to be translated, acquire the words of the text │
│   to be translated and/or parse the pending candidate          │
│ translations, and acquire the words of the pending candidate   │
│              translations vectors                              │
│                      S302                                      │
└─────────────────────────────────────────────┘
                                                    │
┌─────────────────────────────────────────────┐    │
│  Acquire the word vectors corresponding to the words of the │
│ text to be translated based on a predetermined corresponding │
│  relationship between words of a source language and word    │
│                         vectors                              │
│                         S301                                 │
└─────────────────────────────────────────────┘
                       │
                       ▼
┌─────────────────────────────────────────────┐
│ Generate the text vector of the text to be translated based on │
│     word vectors corresponding to words of the text to be      │
│  translated, and a predetermined text vector prediction model  │
│    of the source language, generate the text vectors of the    │
│   pending candidate translations based on the word vectors     │
│    corresponding to the words of the pending candidate         │
│   translations, and a predetermined text vector prediction     │
│                 model of the target language.                  │
│                            S303                                │
└─────────────────────────────────────────────┘
```

FIG. 3

Traverse sentence pairs of parallel corpus sentences of the parallel corpus sentence and calculate translation probabilities between sentences of the target language of the sentence pairs of parallel corpus sentences and corresponding sentences in the source language as the background
S13031

↓

Calculate an average value of the translation probabilities between the sentences in the target language of the sentence pairs of parallel corpus sentences and the corresponding sentences in the source language as the background, to be an average translation probability
S13033

↓

Determine whether the average translation probability is greater than a previous average translation probability. If the determination result is "YES", the computing device may adopt an optimization algorithm, updating the word vectors and the connection weights of the predetermined bilingual encoding and decoding model for text vectors, and re-traversing the sentence pairs of parallel corpus sentences of the parallel corpus sentences
S13035

↓

If the determination result is "NO", designate the adjusted corresponding relationship to be adjusted between the words of the source language and the word vectors as the predetermined corresponding relationship between the words of the source language and the word vectors If the language of the text to be quantized is the source language. If the language of the text to be quantized is the target language, designate the adjusted corresponding relationship to be adjusted between the words of the target language and the word vectors as the predetermined corresponding relationship between the words of the target language and the word vectors
S13037

FIG. 14

METHOD AND SYSTEM FOR GENERATION OF CANDIDATE TRANSLATIONS

CROSS REFERENCE TO RELATED PATENT APPLICATIONS

This application is a continuation of and claims priority to U.S. patent application Ser. No. 15/247,690, filed Aug. 25, 2016, entitled "Method and system for generation of candidate translations," which claims priority to Chinese Patent Application No. 201510527159.3, filed on Aug. 25, 2015, entitled "Method and system for generation of candidate translations," and is related to U.S. patent application Ser. No. 15/247,490, filed Aug. 25, 2016, entitled "Statistics-Based Machine Translation Method, Apparatus and Electronic Device", which applications are hereby incorporated by reference in their entirety.

TECHNICAL FIELD

The present disclosure relates to the field of machine translation technology, particularly to methods and devices for generating candidate translations and quantizing text as well as words.

BACKGROUND

Machine translation refers to the utilization of computing devices to achieve the translation of text from one language to another language. The software implementing machine translation is called a machine translation system. With the development and popularization of computers and the Internet, cultural exchange among people has become more and more frequent. However, there are language barriers in the new era, and there is an urgent need for machine translation.

Machine translation can be divided into a rule-based method and a corpus-based method. The corpus-based methods can be classified into two categories: statistics-based and example-based methods. For a statistics-based machine translation system, a large amount of translation rules are defined by human beings. These rules are rewritten into computer programs to achieve functions of translation. Machine translation based on translation rules have some features such as high translation quality, high costs, low rule coverage, ambiguity etc. As computers become more efficient, the statistics-based machine translation system has dramatically developed since the 1990s, and has gradually become a core research of machine translation. The statistics-based machine translation system is trained using a large scale bilingual corpus based on translation training child models (including translation rule tables, language models, models and other reordering discriminant models or formula etc.). Ideal translation text may then be determined based on scores of these sub-models. Currently, the statistical machine translation methods can be divided into: word-based, phrase-based, hierarchical phrase-based and syntactic-based methods. The statistics-based machine translation system is the most common method for machine translation.

However, existing statistics-based machine translation methods do not reach natural language semantic levels during the generation of candidate translations of each original segment. This results in semantic deviations between the original segment and its candidate translations and in the failure of reaching the same semantic translation effects, thereby severely reducing the quality of machine translation. For example, the original fragment includes the "apple" from "the apple product", and the "apple" is the expression of the semantics of the term "Apple Inc." If translated into food "apple", a semantic deviation may occur, thus affecting the overall effect of the original translation.

In summary, statistical machine translation using existing techniques may cause semantic inconsistency between the original fragments and their translations.

SUMMARY

Implementations herein relate to methods and devices for generating candidate translations. The implementations may solve problems under the conventional techniques such as semantic inconsistency of candidate translations. The implementations further relate to methods and devices for quantizing text and words. This Summary is not intended to identify all key features or essential features of the claimed subject matter, nor is it intended to be used alone as an aid in determining the scope of the claimed subject matter.

In implementations, the implementations relate to a method for generating candidate translations using a statistics-based machine translation system. The method includes generating, by a computing device, pending candidate translations of text to be translated based on predetermined translation rules. The computing device may generate the translation probabilities from the text to be translated to the pending candidate translations based on features having impacts on translation probabilities of the pending candidate translations, and a predetermined translation probability prediction model.

The computing device may select a predetermined number of pending candidate translations that have the translation probabilities higher than other pending candidate translations in the pending candidate translations to be the candidate translations of the text to be translated.

In these implementations, the features may have impacts on the translation probabilities and include information of degrees of semantic similarity between the text to be translated and the candidate translations.

In addition, the implementations further relate to a text quantization method. The method may include acquiring, by a computing device, the text to be quantized, acquiring the word vectors corresponding to the words of the text to be translated based on a predetermined correspondence relationship between words in a source language and word vectors, and generating the text vector of the text to be quantized based on the word vectors corresponding to the words of the text to be translated, and a predetermined text vector prediction model of the first language corresponding to a language of the text to be quantized. In these instances, the word vectors may include word vectors capable of showing bilingual semantic information, and the text vector may include a text vector capable of showing bilingual semantic information.

In addition, the implementations further relate to a method for quantizing words. The method may include reading, by a computing device, a pre-stored parallel corpus, parsing the sentences in the parallel corpus, acquiring words of the source language and words of the target language in the parallel corpus, setting word vectors having a first predetermined dimension for the words of the source language in the parallel corpus, forming a correspondence relationship to be adjusted between the words of the source language in the parallel corpus and the word vectors, setting word vectors having a first predetermined dimension for the words of the target language in the parallel corpus, and forming a correspondence relationship to be adjusted between the words of an target language in the parallel corpus and the word vectors.

The computing device may train a predetermined bilingual encoding and decoding model for text vectors using the parallel corpus. The computing device may adjust the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language.

Compared with the prior art, the implementations of the present disclosure have the following advantages.

The implementations herein relate to methods and devices for generating candidate translations using a statistics-based machine translation system. The implementations include generating, by a computing device, the translation probabilities from the text to be translated to the pending candidate translations based on features having impacts on translation probabilities of the pending candidate translations, and a predetermined translation probability prediction model. The computing device may further select a predetermined number of pending candidate translations that have the translation probabilities higher than other pending candidate translations in the pending candidate translations to be the candidate translations of the text to be translated. In these instances, the features having impacts on the translation probabilities may include degrees of semantic similarity between the text to be translated and the candidate translations. The implementations enable rule-based translations of original fragments of text to reach a natural language semantic level to evaluate translation quality of the candidate translations, therefore improving quality of candidate translations.

BRIEF DESCRIPTION OF THE DRAWINGS

The Detailed Description is described with reference to the accompanying figures. The use of the same reference numbers in different figures indicates similar or identical items.

FIG. 3 is a flow chart of an illustrative process for generating a text vector of text to be translated and text vectors of pending candidate translations.

FIG. 14 is a flow chart of an illustrative process for the operation S1303 as described in FIG. 13.

DETAILED DESCRIPTION

Figure 1:
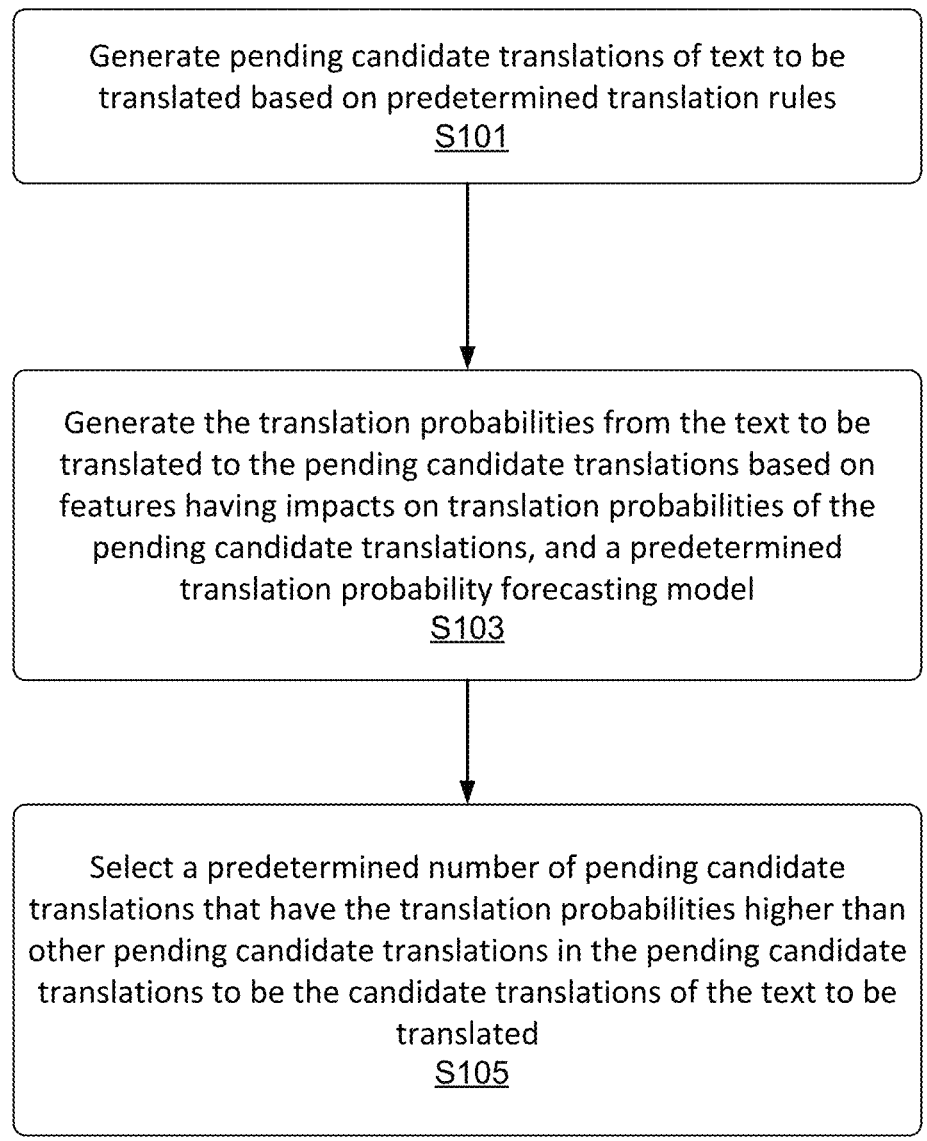
FIG. 1 is a flow chart of an illustrative process for generating candidate translations.

In the following description, numerous specific details are set forth in order to fully understand the present disclosure. However, the present disclosure can be implemented in many other ways than described herein. Those skilled in the art can make similar expansion without departing from the present disclosure. This present disclosure is therefore not limited in the specific embodiments disclosed below.

In implementations, the implementations relate to a method for generating candidate translations using a statistics-based machine translation system. The method includes generating, by a computing device, pending candidate translations of text to be translated based on predetermined translation rules. The computing device may generate the translation probabilities from the text to be translated to the pending candidate translations based on features having impacts on translation probabilities of the pending candidate translations, and a predetermined translation probability prediction model.

The computing device may select a predetermined number of pending candidate translations that have the translation probabilities higher than other pending candidate translations in the pending candidate translations to be the candidate translations of the text to be translated.

In these implementations, the features may have impacts on the translation probabilities and include information of degrees of semantic similarity between the text to be translated and the candidate translations.

In implementations, the computing device may generate the pending candidate translations of the text to be translated based on features having impacts on translation probabilities of the pending candidate translations and a predetermined translation probability prediction model. In these instances, the computing device may determine whether a translation rule of the predetermined translation rules is applicable to the text to be translated for each translation rule of the predetermined translation rules.

If the determination result is "YES", the computing device may generate a pending candidate translation of the text to be translated based on the translation rule.

In implementations, the features having the impacts on the translation probabilities further include at least one of translation probabilities of phrases from the text to be translated and the pending candidate translations, translation probabilities of phrases from the pending candidate translations to the text to be translated, translation probabilities of words from the text to be translated to the pending candidate translations, translation probabilities of words from the pending candidate translations to the text to be translated, or one or more language models of the pending candidate translations, or classification probabilities of reordering and non-reordering of the text to be translated and the pending candidate translations.

In implementations, the computing device may implement a linear regression algorithm and learn a translation probability prediction model from a pre-stored parallel corpus.

In implementations, the degrees of semantic similarity between the text to be translated and the pending candidate translations may be calculated by obtaining a text vector of the text to be translated and text vectors of the pending candidate translations and by calculating distances between the text vector of the text to be translated and the text vectors of the pending candidate translations, to be the degrees of semantic similarity of the text to be translated and the pending candidate translations. In these instances, the text vector may include a text vector capable of showing bilingual semantic information.

In implementations, the text vector of the text to be translated and the text vectors of the pending candidate translations are generated by acquiring the word vectors corresponding to the words of the text to be translated based on a predetermined correspondence relationship between words of a source language and word vectors and by acquiring the word vectors corresponding to the words of the pending candidate translations based on the predetermined correspondence relationship between the words of the target language and the word vectors.

The computing device may further generate the text vector of the text to be translated based on word vectors corresponding to words of the text to be translated, and a predetermined text vector prediction model of the source language and generate the text vectors of the pending candidate translations based on the word vectors corresponding to the words of the pending candidate translations and a predetermined text vector prediction model of the target language. In these instances, the word vectors include word vectors capable of showing bilingual semantic information.

In implementations, the computing device may acquire the word vectors corresponding to the words of the text to be translated based on the predetermined correspondence relationship between the words of the source language and the word vectors. In these instances, before the computing device acquires the word vectors corresponding to the words of the pending candidate translations based on the predetermined correspondence relationship between the words of the target language and the word vectors, the computing device may parse the text to be translated, acquire the words of the text to be translated, parsing the pending candidate translations, and/or acquiring the words of the pending candidate translations.

In implementations, the predetermined text vector prediction models of the target language and the source language are generated by reading a pre-stored parallel corpus, setting a training goal as to maximize average translation probabilities of sentences in the parallel corpus between the target language and the corresponding source language as background, training a predetermined bilingual encoding and decoding model for text vectors, designating an encoding part of the bilingual encoding and decoding model for text vectors after training as the predetermined text vector prediction model of the source language, and by designating a reverse model of the encoding part of the trained bilingual encoding and decoding model for text vectors as the predetermined text vector prediction model of the target language.

In these instances, an input layer of the bilingual encoding and decoding model for text vectors may include words of sentences of the source language and the word vectors corresponding to the words of the sentences of the source language, an output layer of the bilingual encoding and decoding model for text vectors may include words of sentences of the target language and word vectors corresponding to the words of the sentences of the target language. The input layer of the encoding part may include text vectors of the sentences of the source language, and the text vectors of the sentences of the source language may include the input layer of the encoding part.

In implementations, the computing device may set the training goal as to maximize average translation probabilities of the sentences in the parallel corpus between the target language and the corresponding source language as background. In these instances, before the computing device trains the predetermined bilingual encoding and decoding model for text vectors, the computing device may parse the sentences in the parallel corpus, acquire words of the source language and words of the target language in the parallel corpus, and set word vectors having a first predetermined dimension for the words of the source language in the parallel corpus. The computing device may further form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

In implementations, the computing device may set the training goal as to maximize average translation probabilities of the sentences in the parallel corpus between the target language and the corresponding source language as background and may train the predetermined bilingual encoding and decoding model for the text vectors. In these instances, to implement these operations, the computing device may traverse sentence pairs of parallel corpus sentences of the parallel corpus sentence and calculate translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vector. The computing device may further calculate an average value of the translation probabilities between the sentences in the target language of the sentence pairs of parallel corpus sentences and the corresponding sentences in the source language as the background, to be an average translation probability. The computing device may further determine whether the average translation probability is greater than a previous average translation probability.

If the determination result is "YES", the computing device may adopt an optimization algorithm, update the word vectors and the connection weights of the predetermined bilingual encoding and decoding model for text vectors, and re-traverse the sentence pairs of parallel corpus sentences of the parallel corpus sentences.

If the determination result is "NO", the computing device may designate the adjusted correspondence relationship to be adjusted between the words of the source language and the word vectors as the predetermined correspondence relationship between the words of the source language and the word vectors and designate the adjusted correspondence relationship to be adjusted between the words of the target language and the word vectors as the predetermined correspondence relationship between the words of the target language and the word vectors.

In implementations, the computing device may adopt the optimization algorithm. For example, the computing device may adopt a stochastic gradient algorithm. In these instances, the adopting an optimization algorithm, and updating the word vectors and the connection weights of the predetermined bilingual encoding and decoding model for text vectors may be implemented by the following operations.

The computing device may calculate the word vectors and a gradient of the connection weights of the predetermined bilingual encoding and decoding model for text vectors based on a predetermined learning rate and an equation of the average translation probability. Further, the computing device may update the word vectors and the connection weights of the predetermined bilingual encoding and decoding model for text vectors based on the word vectors and a gradient of the connection weights of the predetermined bilingual encoding and decoding model for text vectors.

In implementations, the predetermined bilingual encoding and decoding model for text vectors is a bilingual encoding and decoding model for text vectors based on a recurrent neural network.

In implementations, the translation probabilities between sentences of the target language of the sentence pairs of parallel corpus sentences and corresponding sentences in the source language as the background are calculated using an equation:

$$p(y|x) = \Pi_{t=1}^{T_y} p(y_t|\{y_1, y_2, \ldots, y_{t-1}\}, c),$$

wherein x is a vector sequence of the sentences in the source language, $x=(x_1, x_2, \ldots, x_{T_x})$, y is a vector sequence of the sentences in the target language, $y=(y_1, y_2, \ldots, y_{T_y})$, c is the text vector of the sentences in the source language and is formed by each hidden state of timings in the encoding parts, $c=q(\{h_1, h_2, \ldots, h_{T_x}\})$, $h_t$ indicates the hidden state of timing t of the encoding parts and relates to a current word and a previous hidden state of a sentence in the source language, $h_t=f(x_t, h_{t-1})$, $p(y_t|\{y_1, y_2, \ldots, y_{t-1}\}, c)$ is a text vector of the sentence in the source language and a likelihood probability of $y_t$ in the background of $\{y_1, y_2, \ldots, y_{t-1}\}$ and relates to a previous word of the sentence in the target language, a current hidden state, and the text vector of the sentence in the source language, $p(y_t|\{y_1, y_2, \ldots, y_{t-1}\}, c)=g(y_{t-1}, s_t, c)$, $s_t$ indicates the hidden state of timing t of the decoding parts and relates to the previous word of the sentence in the target language, the previous hidden state, and a text vector of the sentence in the source language, and $s_t=f(y_{t-1}, s_{t-1}, c)$, f and g are non-linear activation functions.

In implementations, distances between text vectors may include a text cosine angle distance or Euclidean distance.

Further, the implementations relate to a statistics-based machine translation system. The computing device may include a first generating module configured to generate pending candidate translations of text to be translated based on predetermined translation rules; a first calculating module configured to generate the translation probabilities from the text to be translated to the pending candidate translations based on features having impacts on translation probabilities of the pending candidate translations, and a predetermined translation probability prediction model; a selecting module configured to select a predetermined number of pending candidate translations that have the translation probabilities higher than other pending candidate translations in the pending candidate translations to be the candidate translations of the text to be translated.

In implementations, the features having impacts on the translation probabilities may include degrees of semantic similarity between the text to be translated and the candidate translations.

In implementations, the first generating module may include a determining sub-module configured to determine whether a translation rule of the predetermined translation rules is applicable to the text to be translated for each translation rule of the predetermined translation rules; a generating sub-module configured to generate a pending candidate translation of the text to be translated based on the translation rule if the determination result is "YES".

In implementations, the system may further include a second calculating module configured to calculate degrees of semantic similarity of the text to be translated and the pending candidate translations.

In implementations, the second calculating module may include an acquiring sub-module configured to obtain a text vector of the text to be translated, and text vectors of the pending candidate translations; a computing sub-module configured to calculate distances between the text vector of the text to be translated and the text vectors of the pending candidate translations to be the degrees of semantic similarity of the text to be translated and the pending candidate translations. In these instances, the text vector may include a text vector capable of showing bilingual semantic information.

In implementations, the system may further include a second generating module configured to generate the text vector of the text to be translated and the text vectors of the pending candidate translations.

In implementations, the second generating module may include an acquiring sub-module configured to acquire the word vectors corresponding to the words of the text to be translated based on a predetermined correspondence relationship between words of a source language and word vectors and to acquire the word vectors corresponding to the words of the pending candidate translations based on the predetermined correspondence relationship between the words of the target language and the word vectors; a generating sub-module configured to generate the text vector of the text to be translated based on the word vectors corresponding to the words of the text to be translated, and a predetermined text vector prediction model of the source language and to generate the text vectors of the pending candidate translations based on the word vectors corresponding to the words of the pending candidate translations, and a predetermined text vector prediction model of the target language. In these instances, the word vectors may include word vectors capable of showing bilingual semantic information.

In implementations, the second generating module may include a parsing sub-module configured to parse the text to be translated, acquire the words of the text to be translated, parse the pending candidate translations, and/or acquire the words of the pending candidate translations.

In implementations, the system may include a third generating module configured to generate the predetermined text vector prediction models of the target language and the source language.

In implementations, the third generating module may include a reading sub-module configured to read a pre-stored parallel corpus; a training sub-module configured to set a training goal as to maximize average translation probabilities of sentences in the parallel corpus between the target language and the corresponding source language as background and to train a predetermined bilingual encoding and decoding model for text vectors; a setting sub-module configured to designate an encoding part of the bilingual encoding and decoding model for text vectors as the predetermined text vector prediction model of the source language and to designate a reverse model of the encoding part of the trained bilingual encoding and decoding model for text vectors as the predetermined text vector prediction model of the target language. In these instances, an input layer of the bilingual encoding and decoding model for text vectors may include words of sentences of the source language and the word vectors corresponding to the words of the sentences of the source language. An output layer of the bilingual encoding and decoding model for text vectors may include words of sentences of the target language and word vectors corresponding to the words of the sentences of the target language. The input layer of the encoding part may include text vectors of the sentences of the source language, and the text vectors of the sentences of the source language may include the input layer of the encoding part.

In implementations, the third generating module may include a parsing sub-module configured to parse sentences in the parallel corpus and to acquire words of the source language and words of the target language in the parallel corpus; an initializing sub-module configured to set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

In implementations, the training module may include a first calculating sub-module configured to traverse sentence pairs of parallel corpus sentences of the parallel corpus sentences and to calculating translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vector; a second calculating sub-module configured to calculate an average value of the translation probabilities between sentences in the target language of the sentence pairs of parallel corpus sentences and corresponding sentences in the source language as the background to be an average translation probability; and a determining sub-module configured to determine whether the average translation probability is greater than a previous average translation probability.

If the determination result is "YES", the determining sub-module may adopt an optimization algorithm, update the word vectors and the connection weights of the predetermined bilingual encoding and decoding model for text vectors, and re-traverse the sentence pairs of parallel corpus sentences of the parallel corpus sentences.

If the determination result is "NO", the determining sub-module may designate the adjusted correspondence relationship to be adjusted between the words of the source language and the word vectors as the predetermined correspondence relationship between the words of the source language and the word vectors and designate the adjusted correspondence relationship to be adjusted between the words of the target language and the word vectors as the predetermined correspondence relationship between the words of the target language and the word vectors.

Further, the implementations further relate to an electronic device for generating candidate translations. The electronic device may include a display; one or more processors; and memory. For example, the memory may store instructions for generating candidate translations, and when the instructions are processed by the one or more processors, the electronic device may implement the following operations. The electronic device may generate pending candidate translations of text to be translated based on predetermined translation rules. Further the electronic device may generate the translation probabilities from the text to be translated to the pending candidate translations based on features having impacts on translation probabilities of the pending candidate translations, and a predetermined translation probability prediction model. The electronic device may further select a predetermined number of pending candidate translations that have the translation probabilities higher than other pending candidate translations in the pending candidate translations to be the candidate translations of the text to be translated. In these instances, the features having impacts on the translation probabilities may include degrees of semantic similarity between the text to be translated and the candidate translations.

In addition, the implementations further relate to a text quantization method. The method may include acquiring, by a computing device, the text to be quantized, acquiring the word vectors corresponding to the words of the text to be translated based on a predetermined correspondence relationship between words in a source language and word vectors, and generating the text vector of the text to be quantized based on the word vectors corresponding to the words of the text to be translated, and a predetermined text vector prediction model of the first language corresponding to a language of the text to be quantized. In these instances, the word vectors may include word vectors capable of showing bilingual semantic information, and the text vector may include a text vector capable of showing bilingual semantic information.

In implementations, before the computing device may acquire the word vectors corresponding to words of the text to be translated based on a predetermined correspondence relationship between the words and the word vectors, the computing device may parse the text to be quantized, acquiring the words of the text to be quantized.

In implementations, the text vector prediction mode of the first language is generated by reading a pre-stored parallel corpus, setting a training goal as to maximize average translation probabilities of sentences in the parallel corpus between the target language and the corresponding source language as background, and training a predetermined bilingual encoding and decoding model for text vectors.

If the language of the text to be quantized is the source language, the computing device may designate an encoding part of the bilingual encoding and decoding model for text vectors as the text vector prediction model of the first language.

If the language of the text to be quantized is the target language, the computing device may designate a reverse model of the encoding part of the trained bilingual encoding and decoding model for text vectors as the text vector prediction model of the first language. In these instances, an input layer of the bilingual encoding and decoding model for text vectors may include words of sentences of the source language and the word vectors corresponding to the words of the sentences of the source language, and an output layer of the bilingual encoding and decoding model for text vectors may include words of sentences of the target language and word vectors corresponding to the words of the sentences of the target language. The input layer of the encoding part may include text vectors of the sentences of the source language, and the text vectors of the sentences of the source language may include the input layer of the encoding part.

In implementations, the computing device may set the training goal as to maximize average translation probabilities of the sentences in the parallel corpus between the target language and the corresponding source language as background. In these instances, before the computing device trains the predetermined bilingual encoding and decoding model for text vectors, the computing device may parse the sentences in the parallel corpus, acquire words of the source language and words of the target language in the parallel corpus, set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

In implementations, the computing device may set the training goal as to maximize average translation probabilities of the sentences in the parallel corpus between the target language and the corresponding source language as background and train the predetermined bilingual encoding and decoding model for the text vectors. In these instances, the computing device may traverse sentence pairs of parallel corpus sentences of the parallel corpus sentence, calculate translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vector, and calculate an average value of the translation probabilities between the sentences in the target language of the sentence pairs of parallel corpus sentences and the corresponding sentences in the source language as the background to be an average translation probability. Further, the computing device may determine whether the average translation probability is greater than a previous average translation probability.

If the determination result is "YES", the computing device may adopt an optimization algorithm, update the word vectors and the connection weights of the predetermined bilingual encoding and decoding model for text vectors, and re-traverse the sentence pairs of parallel corpus sentences of the parallel corpus sentences.

If the determination result is "NO", the computing device may designate the adjusted correspondence relationship to be adjusted between the words of the source language and the word vectors as the predetermined correspondence relationship between the words of the source language and the word vectors if the language of the text to be quantized is the source language. If the language of the text to be quantized is the target language, the computing device may designate the adjusted correspondence relationship to be adjusted between the words of the target language and the word vectors as the predetermined correspondence relationship between the words of the target language and the word vectors.

In implementations, the adopting the optimization algorithm may include adopting a stochastic gradient algorithm. The adopting an optimization algorithm and updating the word vectors and the connection weights of the predetermined bilingual encoding and decoding model for text vectors may be implemented by the following operations. The computing device may calculating the word vectors and a gradient of the connection weights of the predetermined bilingual encoding and decoding model for text vectors based on a predetermined learning rate and an equation of the average translation probability, and then update the word vectors and the connection weights of the predetermined bilingual encoding and decoding model for text vectors based on the word vectors and the a gradient of the connection weights of the predetermined bilingual encoding and decoding model for text vectors.

In implementations, the predetermined bilingual encoding and decoding model for text vectors is a bilingual encoding and decoding model for text vectors based on a recurrent neural network.

In implementations, the translation probabilities between sentences of the target language of the sentence pairs of parallel corpus sentences and corresponding sentences in the source language as the background are calculated using an equation:

$$p(y|x) = \Pi_{t=1}^{T_y} p(y_t | \{y_1, y_2, \ldots, y_{t-1}\}, c),$$

wherein x is a vector sequence of the sentences in the source language, $x=(x_1, x_2, \ldots, x_{T_x})$, y is a vector sequence of the sentences in the target language, $y=(y_1, y_2, \ldots, y_{T_y})$, c is the text vector of the sentences in the source language and is formed by each hidden state of timings in the encoding parts, $c=q(\{h_1, h_2, \ldots, h_{T_x}\})$, $h_t$ indicates the hidden state of timing t of the encoding parts and relates to a current word and a previous hidden state of a sentence in the source language, $h_t=f(x_t, h_{t-1})$, $p(y_t|\{y_1, y_2, \ldots, y_{t-1}\}, c)$ is a text vector of the sentence in the source language and a likelihood probability of $y_t$ in the background of $\{y_1, y_2, \ldots, y_{t-1}\}$ and relates to a previous word of the sentence in the target language, a current hidden state, and the text vector of the sentence in the source language, $p(y_t|\{y_1, y_2, \ldots, y_{t-1}\}, c)=g(y_{t-1}, s_t, c)$, $s_t$ indicates the hidden state of timing t of the decoding parts and relates to the previous word of the sentence in the target language, the previous hidden state, and a text vector of the sentence in the source language, and $s_t=f(y_{t-1}, s_{t-1}, c)$, f and g are non-linear activation functions.

Further, the implementations further relate to a device for quantizing text. The device may include an acquiring module configured to acquire the text to be quantized; a mapping module configured to acquire the word vectors corresponding to the words of the text to be translated based on a predetermined correspondence relationship between words in a source language and word vectors; a predicting module configured to generate the text vector of the text to be quantized based on the word vectors corresponding to the words of the text to be translated, and a predetermined text vector prediction model of the first language corresponding to a language of the text to be quantized. In these instances, the word vectors may include word vectors capable of showing bilingual semantic information, and the text vector may include a text vector capable of showing bilingual semantic information.

In implementations, the device may further include a parsing module configured to parse the text to be translated and acquire the words of the text to be quantized.

In implementations, the device may further include a generating module configured to generate a text vector prediction model of the first language.

In implementations, the generating module may include a reading sub-module configured to read a pre-stored parallel corpus; a training sub-module configured to set a training goal as to maximize average translation probabilities of sentences in the parallel corpus between the target language and the corresponding source language as background and train a predetermined bilingual encoding and decoding model for text vectors; a setting sub-module configured to designate an encoding part of the bilingual encoding and decoding model for text vectors as the text vector prediction model of the first language if the language of the text to be quantized is the source language. If the language of the text to be quantized is the target language, the setting sub-module may designate a reverse model of the encoding part of the trained bilingual encoding and decoding model for text vectors, as the text vector prediction model of the first language. In these instances, an input layer of the bilingual encoding and decoding model for text vectors may include words of sentences of the source language and the word vectors corresponding to the words of the sentences of the source language, and an output layer of the bilingual encoding and decoding model for text vectors may include words of sentences of the target language and word vectors corresponding to the words of the sentences of the target language. The input layer of the encoding part may include text vectors of the sentences of the source language, and the text vectors of the sentences of the source language may include the input layer of the encoding part.

In implementations, the generating module further may include a parsing sub-module configured to parse sentences in the parallel corpus and acquire words of the source language and words of the target language in the parallel corpus; an initializing sub-module configured to set word vectors having a first predetermined dimension for the words of the source language in the parallel corpus, forming a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

In implementations, the training module may include a first calculating sub-module configured to traverse sentence pairs of parallel corpus sentences of the parallel corpus sentences, calculate translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vector; a second calculating sub-module configured to calculate an average value of the translation probabilities between sentences in the target language of the sentence pairs of parallel corpus sentences and corresponding sentences in the source language as the background, to be an average translation probability; a determining sub-module configured to determine whether the average translation probability is greater than a previous average translation probability.

If the determination result is "YES", the determining sub-module may adopt an optimization algorithm, update the word vectors and the connection weights of the predetermined bilingual encoding and decoding model for text vectors, and re-traverse the sentence pairs of parallel corpus sentences of the parallel corpus sentences.

If the determination result is "NO", the setting sub-module may be configured to designate the adjusted correspondence relationship to be adjusted between the words of the source language and the word vectors as the predetermined correspondence relationship between the words of the source language and the word vectors if the language of the text to be quantized is the source language. If the language of the text to be quantized is the target language, the setting sub-module may designate the adjusted correspondence relationship to be adjusted between the words of the target language and the word vectors as the predetermined correspondence relationship between the words of the target language and the word vectors.

Accordingly, the implementations further relate to an electronic device for generating candidate translations. The electronic device may include a display, one or more processors, and memory, wherein the memory store instructions for generating candidate translations, when the instructions are processed by the one or more processors, the electronic device may perform the following operations. The electronic device may acquire the text to be quantized, acquire the word vectors corresponding to the words of the text to be translated based on a predetermined correspondence relationship between words in a source language and word vectors, and generate the text vector of the text to be quantized based on the word vectors corresponding to the words of the text to be translated, and a predetermined text vector prediction model of the first language corresponding to a language of the text to be quantized. In these instances, the word vectors may include word vectors capable of showing bilingual semantic information. The text vector may include a text vector capable of showing bilingual semantic information.

In addition, the implementations further relate to a method for quantizing words. The method may include reading, by a computing device, a pre-stored parallel corpus, parsing the sentences in the parallel corpus, acquiring words of the source language and words of the target language in the parallel corpus, setting word vectors having a first predetermined dimension for the words of the source language in the parallel corpus, forming a correspondence relationship to be adjusted between the words of the source language in the parallel corpus and the word vectors, setting word vectors having a first predetermined dimension for the words of the target language in the parallel corpus, and forming a correspondence relationship to be adjusted between the words of an target language in the parallel corpus and the word vectors.

The computing device may train a predetermined bilingual encoding and decoding model for text vectors using the parallel corpus. The computing device may adjust the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language.

In implementations, the bilingual prediction model for text vectors is a bilingual encoding and decoding model for text vectors. The computing device may train a predetermined bilingual encoding and decoding model for text vectors using the parallel corpus. The computing device may further adjust the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language. In these instances, the computing device may set a training goal as to maximize average translation probabilities of sentences in the parallel corpus between the target language and the corresponding source language as background, and train the predetermined bilingual encoding and decoding model for the text vectors, adjust the correspondence relationship to be adjusted between the words of the source language in the parallel corpus and the word vectors and the word vectors of the correspondence relationship to be adjusted between the words of the target language and the word vectors, and acquire the word vectors capable of showing semantic information in the source language and the word vectors capable of showing semantic information in the target language.

In implementations, an input layer of the bilingual encoding and decoding model for text vectors may include words of sentences of the source language and the word vectors corresponding to the words of the sentences of the source language, an output layer of the bilingual encoding and decoding model for text vectors may include words of sentences of the target language and word vectors corresponding to the words of the sentences of the target language, the input layer of the encoding part may include text vectors of the sentences of the source language, and the text vectors of the sentences of the source language may include the input layer of the encoding part.

In implementations, the computing device may set the training goal as to maximize average translation probabilities of the sentences in the parallel corpus between the target language and the corresponding source language as background, train the predetermined bilingual encoding and decoding model for the text vectors, adjust the correspondence relationship to be adjusted between the words of the source language in the parallel corpus and the word vectors and the word vectors of the correspondence relationship to be adjusted between the words of the target language and the word vectors, and acquire the word vectors capable of showing semantic information in the source language and word vectors capable of showing semantic information in the target language. In these instances, the computing device may traverse sentence pairs of parallel corpus sentences of the parallel corpus sentence, and calculate translation probabilities between sentences of the target language of the sentence pairs of parallel corpus sentences and corresponding sentences in the source language as the background based on the correspondence relationship to be adjusted between the words of the source language and the word vectors, a correspondence relationship to be adjusted between the words of the target language and the word vectors, and the predetermined bilingual encoding and decoding model for text vector.

Further, the computing device may calculate an average value of the translation probabilities between the sentences in the target language of the sentence pairs of parallel corpus sentences and the corresponding sentences in the source language as the background to be an average translation probability and determine whether the average translation probability is greater than a previous average translation probability.

If the determination result is "YES", the computing device may adopt an optimization algorithm and update the correspondence relationship to be adjusted between the words of the source language and the word vectors and the word vectors of the correspondence relationship to be adjusted between the words of the target language and the word vectors, and connection weights of the bilingual encoding and decoding model for text vectors, and re-traversing the sentence pairs of parallel corpus sentences of the parallel corpus sentences.

If the determination result is "NO", the computing device may design the word vectors of the adjusted correspondence relationship to be adjusted between the words of the source language and the word vectors as the word vectors capable of showing semantic information in the source language and designate the adjusted correspondence relationship to be adjusted between the words of the target language and the word vectors as the predetermined correspondence relationship between the words of the target language and the word vectors as the word vectors capable of showing semantic information in the source language.

In implementations, the optimization algorithm may include a stochastic gradient algorithm. The computing device may adopt an optimization algorithm, and updating the correspondence relationship to be adjusted between the words of the source language and the word vectors and the word vectors of the correspondence relationship to be adjusted between the words of the target language and the word vectors, and connection weights of the bilingual encoding and decoding model for text vectors.

In these instances, the computing device may calculate the correspondence relationship to be adjusted between the words of the source language and the word vectors and a gradient of the word vectors of the correspondence relationship to be adjusted between the words of the target language and the word vectors, and a gradient of the connection weights of the bilingual encoding and decoding model for text vectors. Further, the computing device may update the correspondence relationship to be adjusted between the words of the source language and the word vectors, the word vectors of the correspondence relationship to be adjusted between the words of the target language and the word vectors, and the connection weights of the predetermined bilingual encoding and decoding model for text vector based on the correspondence relationship to be adjusted between the words of the source language and the word vectors and the gradient of the word vectors of the correspondence relationship to be adjusted between the words of the target language and the word vectors, and a gradient of the connection weights of the bilingual encoding and decoding model for text vectors.

In implementations, the predetermined bilingual encoding and decoding model for text vectors is a bilingual encoding and decoding model for text vectors based on a recurrent neural network.

In implementations, the translation probabilities between sentences of the target language of the sentence pairs of parallel corpus sentences and corresponding sentences in the source language as the background are calculated using an equation:

$$p(y|x) = \Pi_{t=1}^{T_y} p(y_t | \{y_1, y_2, \ldots, y_{t-1}\}, c),$$

wherein x is a vector sequence of the sentences in the source language, $x = (x_1, x_2, \ldots, x_{T_x})$, y is a vector sequence of the sentences in the target language, $y = (y_1, y_2, \ldots, y_{T_y})$, c is the text vector of the sentences in the source language and is formed by each hidden state of timings in the encoding parts, $c = q(\{h_1, h_2, \ldots, h_{T_x}\})$, $h_t$ indicates the hidden state of timing t of the encoding parts and relates to a current word and a previous hidden state of a sentence in the source language, $h_t = f(x_t, h_{t-1})$, $p(y_t|\{y_1, y_2, \ldots y_{t-1}\}, c)$ is a text vector of the sentence in the source language and a likelihood probability of $y_t$ in the background of $\{y_1, y_2, \ldots, y_{t-1}\}$ and relates to a previous word of the sentence in the target language, a current hidden state, and the text vector of the sentence in the source language, $p(y_t|\{y_1, y_2, \ldots, y_{t-1}\}, c) = g(y_{t-1}, s_t, c)$, $s_t$ indicates the hidden state of timing t of the decoding parts and relates to the previous word of the sentence in the target language, the previous hidden state, and a text vector of the sentence in the source language, and $s_t = f(y_{t-1}, s_{t-1}, c)$, f and g are non-linear activation functions.

Further, the implementations further relate to a device for quantizing words. The device may include a retrieving module configured to read a pre-stored parallel corpus; a parsing module configured to parse sentences in the parallel corpus, acquiring words of the source language and words of the target language in the parallel corpus; an initializing module configured to set word vectors having a first predetermined dimension for the words of the source language in the parallel corpus, to form a correspondence relationship to be adjusted between the words of the source language in the parallel corpus and the word vectors, set word vectors having a first predetermined dimension for the words of the target language in the parallel corpus, and form a correspondence relationship to be adjusted between the words of an target language in the parallel corpus and the word vectors.

The device may further include a training module configured to adjust the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language based on the parallel corpus, training a predetermined bilingual encoding and decoding model for text vectors.

In implementations, the bilingual prediction model for text vectors is a bilingual encoding and decoding model for text vectors. The device may train a predetermined bilingual encoding and decoding model for text vectors based on the parallel corpus, adjust the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language.

In these instances, the device may set a training goal as to maximize average translation probabilities of sentences in the parallel corpus between the target language and the corresponding source language as background, train the predetermined bilingual encoding and decoding model for the text vectors, adjust the correspondence relationship to be adjusted between the words of the source language in the parallel corpus and the word vectors and the word vectors of the correspondence relationship to be adjusted between the words of the target language and the word vectors, and acquire the word vectors capable of showing semantic information in the source language and the word vectors capable of showing semantic information in the target language.

Further, an input layer of the bilingual encoding and decoding model for text vectors may include words of sentences of the source language and the word vectors corresponding to the words of the sentences of the source language, an output layer of the bilingual encoding and decoding model for text vectors may include words of sentences of the target language and word vectors corresponding to the words of the sentences of the target language, the input layer of the encoding part may include text vectors of the sentences of the source language, and the text vectors of the sentences of the source language may include the input layer of the encoding part.

In implementations, the training module may include a first calculating sub-module configured to traverse the parallel corpus of sentence pairs of the parallel corpus sentences and to calculate translation probabilities between sentences of the target language of the sentence pairs of parallel corpus sentences and corresponding sentences in the source language as the background based on the correspondence relationship to be adjusted between the words of the source language and the word vectors, a correspondence relationship to be adjusted between the words of the target language and the word vectors, and the predetermined bilingual encoding and decoding model for text vector.

The training module may further include a second calculating sub-module configured to calculate an average value of the translation probabilities between sentences in the target language of the sentence pairs of parallel corpus sentences and corresponding sentences in the source language as the background to be an average translation probability.

The training module may further include a determining sub-module configured to determine whether the average translation probability is greater than a previous average translation probability.

If the determination result is "YES", the device may adopt an optimization algorithm, update the correspondence relationship to be adjusted between the words of the source language and the word vectors and the word vectors of the correspondence relationship to be adjusted between the words of the target language and the word vectors, and connection weights of the bilingual encoding and decoding model for text vectors, and re-traverse the sentence pairs of parallel corpus sentences of the parallel corpus sentences.

If the determination result is "NO", the device may design the word vectors of the adjusted correspondence relationship to be adjusted between the words of the source language and the word vectors as the word vectors capable of showing semantic information in the source language, and designate the adjusted correspondence relationship to be adjusted between the words of the target language and the word vectors as the predetermined correspondence relationship between the words of the target language and the word vectors as the word vectors capable of showing semantic information in the source language.

Further, the implementations further relate to an electronic device for generating candidate translations. The device may include a display, one or more processors, and memory. The memory store instructions for generating candidate translations, when the electronic device is processed by the one or more processors, the electronic device may perform the following operations.

The electronic device may read a pre-stored parallel corpus, parse the sentences in the parallel corpus, acquire words of the source language and words of the target language in the parallel corpus; setting word vectors having a first predetermined dimension for the words of the source language in the parallel corpus, form a correspondence relationship to be adjusted between the words of the source language in the parallel corpus and the word vectors and set word vectors having a first predetermined dimension for the words of the target language in the parallel corpus, form a correspondence relationship to be adjusted between the words of an target language in the parallel corpus and the word vectors, train a predetermined bilingual encoding and decoding model for text vectors based on the parallel corpus, and adjusting the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language.

Implementations herein relate to methods and devices for generating candidate translations and for quantizing text and words.

The implementations further relate to a method for generating candidate translations. The implementations reach natural language semantic levels when evaluating quality of a candidate translation. In other words, the implementations take account of the degrees of semantic similarity between text to be translated and the pending candidate translations. Since the degree of semantic similarity is used as a feature to evaluate quality of candidate translations, the implementations therefore increase quality of the candidate translations.

As illustrated, FIG. 1 is a flow chart of an illustrative process for generating candidate translations. The process may include the following operations implemented by a computing device.

At S101, the computing device may generate pending candidate translations of text to be translated based on predetermined translation rules.

The text to be translated in the present disclosure includes original fragments to be translated of specified original text the machine translation. In other words, the specified original text includes strings with various size. For example, if the specified text is "我在公 园里散步" then sub-strings includes: two-word strings such as "我在" and "公园" etc., three-word strings such as "在公园" and "公园里" etc., four-word strings such as "我在公园" etc., and other strings such as "我在公园里散步" etc. These strings may be the text to be translated in accordance with the implementations of the present disclosure. In addition, the specified description itself may be used as text to be translated.

To evaluate quality of the pending candidate translations of the pending candidate translations, the computing device may first generate pending candidate translations of text to be translated based on predetermined translation rules. The translations rules of the present disclosure refer to translation rules obtained from learning a predetermined parallel corpus. A translation rule is a basic unit of machine translation. For example, translation rules are based on translation rules of phrases and their syntactic information. Implementations of various translation rules do not deviate from the core of the present disclosure, and therefore, are within the scope of the present disclosure.

It should be noted that, the pending candidate translations generated using translation rules of phrases usually do not meet rules of syntax, thus making candidate translations difficultly understood the. The pending candidate translations generated using translation rules of syntax usually meet the rules of syntax. Accordingly, the pending translations generated using syntax information can improve quality of candidate translations.

In implementations, the computing device may generate pending candidate translations of text to be translated based on the syntax information of translation rules. The computing device may extract translation rules containing syntax information. The translation rules adopt composite context and is grammar free, as illustrated in Table 1:

TABLE 1 the translation rule table

| Rule Numbering | Translation Rule |
| --- | --- |
| 1 | 他 --> NP(PRP(he)) |
| 2 | 对 $NP_1$ --> PP(IN(with)$NP_1$) |
| 3 | 回答 --> NP(DT(the)NNS(answers)) |
| 4 | 表示 --> VBZ(was) |
| 5 | 满意 --> VBZ(satisfied)) |
| 6 | $PP_1$ $VBZ_2$ $VBN_3$ --> VP($VBZ_2$ VP($VBZ_3$ $PP_1$)) |
| 7 | $NP_1$ $VP_2$ --> $NP_1$ $VP_2$ |

Table 1 lists number 1, 3, 4, 5 and corresponding rules for basic translation rules. Table 1 further lists number 2, 6, 7 and corresponding rules for a combination of translation rules.

After extraction of the translation rules, the computing device may extract features of the translation rules. The features of the translation rules may include: a forward translation probability, reverse translation probability, positive vocabulary probability, and reverse vocabulary probability. In these instances, the forward translation probabilities of phrases refer to a translation probability of a translation of a phrase from a source language to a target language. The reverse translation probabilities of phrases refer to a translation probability of a translation of a phrase from a target language to a source language. The positive vocabulary probability refers to a translation probability of a word from a source language to a target language. The reverse vocabulary probability refers to a translation probability of a translation of a word from a target language to a source language.

In implementations, the generating a pending candidate translation of the text to be translated based on predetermined translation rules may be implemented by the following operations. The computing device may determine whether a translation rule of the predetermined translation rules is applicable to the text to be translated for each translation rule of the predetermined translation rules.

If the determination result is "YES", the computing device may generate a pending candidate translation of the text to be translated based on the translation rule.

The computing device may parse each translation rules and determine whether the text to be translated is applicable to the translation rule for the text to be translated. In response to a determination that the text to be translated is applicable to the translation rule, the computing device may generate a pending candidate translation based on the translation rule. The text to be translated may be applicable to multiple translation rules. Accordingly, the text to be translated may correspond to multiple pending candidate translations.

At S103, the computing device may generate the translation probabilities from the text to be translated to the pending candidate translations based on features having impacts on translation probabilities of the pending candidate translations, and a predetermined translation probability prediction model.

In the present disclosure, features having an impact on translation probability refer to statistical information of features having impacts on translation probabilities of the pending candidate translations. For example, the features may include a translation model, language model and reordering model. In implementations, the features having the impacts on the translation probabilities further may include: at least one of translation probabilities of phrases from the text to be translated and the pending candidate translations, translation probabilities of phrases from the pending candidate translations to the text to be translated, translation probabilities of words from the text to be translated to the pending candidate translations, translation probabilities of words from the pending candidate translations to the text to be translated, one or more language models of the pending candidate translations, or classification probabilities of reordering and non-reordering of the text to be translated and the pending candidate translations. Descriptions regarding a translation rule module, a language model module, a reordering model module and so on are provided below.

1) Translation Model

A translation model indicates a correspondence relationship from a language to another language. A language model is reflected in the nature of a language itself. The translation model ensures the meaning of translations. The language model ensures smooth translation. "Faithfulness" is traditional requirement for translation. Translation model reflects first two parts of the requirement. The last part of the requirement is reflected in the language model.

Features related to a translation module include: translation probabilities of phrases from the text to be translated and the pending candidate translations, translation probabilities of phrases from the pending candidate translations to the text to be translated, translation probabilities of words from the text to be translated to the pending candidate translations, translation probabilities of words from the pending candidate translations to the text to be translated, and one or more language models of the pending candidate translations. As described in the present disclosure, the features of translation models may be calculated during the extraction of translation rules. In other words, the computing device may obtain, from the parallel corpus, forward translation probabilities of phrases, reverse translation probabilities of phrases, positive vocabulary probabilities of words, and reverse vocabulary probabilities of words that correspond to a translation rule.

2) Language Model

Language model (LM) deals with a fundamental problem in the field of natural language processing and play an important role in tasks such as speech tagging, syntax parsing, machine translation, and information retrieval. In short, a statistical language model is expressed a sequence probability of occurrence in a word sequence, given words in the context of a word and the words. For example, a language model is a measure of fluency of the text. For example, Text to be translated "今晚有大风" may be translated into two pending candidate translations: "high winds tonight" or "large winds tonight." The probability of "high winds tonight" is greater than the probability of "high winds tonight" can be illustrated as P (high winds tonight)>P (large winds tonight).

3) Reordering Model

Many languages deals with word orders differently. For example, Word orders in Chinese and English are different. In a word alignment process, the reordering model may be implemented. In discriminative training, there is a need for a better reordering model. Reordering models can be location-based, namely, reordering probabilities describing different locations of phrases in each sentence in two languages. And reordering models can be phrase-based. For example, the reordering model in Moses that is phrase-based, wherein describes whether, for a given phrase pair, phrase pairs before and after the given phrase pair can be exchanged.

Above describes the features having impacts on translation probabilities of the pending candidate translations. The implementations relate to a method for generating candidate translations. In addition to the features described above, features of a semantic model may also be utilized. In other words, degrees of semantic similarity between the text to be translated and the pending candidate translations is a strong influence to the translation probabilities from the text to be translated to the pending candidate translations such that translation probabilities may be improved by using pending translation candidates of which semantics are more consistent given the same conditions.

Figure 2:
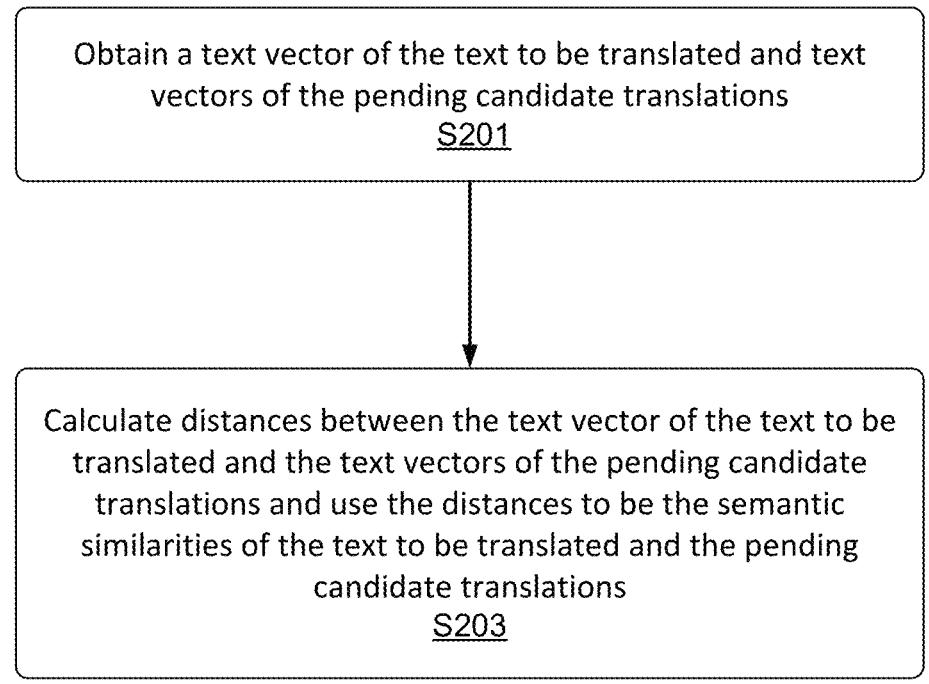
FIG. 2 is a flow chart of an illustrative process for calculating a degree of semantic similarity to generate candidate translations.

As illustrated, FIG. 2 is a flow chart of an illustrative process for calculating degrees of semantic similarity to generate candidate translations. The degrees of semantic similarity between the text to be translated and the pending candidate translations may be calculated by the following operations.

At S201, the computing device may obtain a text vector of the text to be translated and text vectors of the pending candidate translations.

The text vector may include a text vector capable of showing bilingual semantic information. In other words, for related or similar text translations, the distance between the text vectors is closer. For example, the distance between a text vector of "One tablet will purify a liter of water" and a text vector of "一颗药丸即可净化一升水" is smaller than the distance between a text vector of "One tablet will purify a liter of water" and a text vector of "一部平板电脑即可净化一升水". In an ideal case, the text vector of "One tablet will purify a liter of water" and the text vector of "一颗药丸即可净化一升水" are the same. However, due to clerical errors and other reasons, the two text vectors are not the same, while the distance between them is small. In implementations, the distance between the text vectors may be measured using the most traditional Euclidean distance and the cosine of the angle. A text vector is a real vector a fixed-dimension. For example, a text vector may be represented as a [0.312, −0.187, −0.529, 0.109, −0.542, . . . ].

As illustrated, FIG. 3 is a flow chart of an illustrative process for generating a text vector of text to be translated and text vectors of pending candidate translations. In implementations, the text vector of the text to be translated and the text vectors of the pending candidate translations may be generated by the following operations.

At S301, the computing device may acquire the word vectors corresponding to the words of the text to be translated based on a predetermined correspondence relationship between words of a source language and word vectors. The computing device may acquire the word vectors corresponding to the words of the pending candidate translations based on the predetermined correspondence relationship between the words of the target language and the word vectors.

In the present disclosure, the source language refers to a language of the text to be translated. The target language refers to a language of the pending candidate translations. The predetermined correspondence relationship between the words of the source language and the word vectors and word vectors of the relationship between words and corresponding word vectors in the target language (Distributed Representation) are word vectors capable of showing bilingual semantic information. In other words, word vectors not only reflect the basic unit of natural language in terms of basic semantic information, but also include cross-language semantic information. For two words in different languages having the same semantics, the geometric distance between their word vectors is very close, for example, "苹果" and "Apple". A word vector is a real vector with a fixed-dimension, and a class of neural network parameters. For example, the word vector may be represented as [0.792, −0.177, −0.107, 0.109, −0.542, . . . ].

It should be noted that, a word vector may be represented in various ways, and different training methods may lead to different word vectors of the same word. In implementations, a word vector may be generated by a variety of bilingual word vector prediction models based on a neural network such as neural network models of bilingual language or bilingual text vector prediction models. In addition, dimensional word vectors may be used as super neural network parameters, generally the higher dimension the better result. But the word vector with a high dimension may increase computational complexity. In implementations, a common dimension of word vectors is of 200.

At S303, the computing device may generate the text vector of the text to be translated based on word vectors corresponding to words of the text to be translated, and a predetermined text vector prediction model of the source language. The computing device may generate the text vectors of the pending candidate translations based on the word vectors corresponding to the words of the pending candidate translations, and a predetermined text vector prediction model of the target language.

By performing operation S301, the computing device may map each word of the text to be translated and the pending candidate translations to a space of word vectors. Then, at S303, the computing device may designate word vectors corresponding to individual words of the text to be translated as variables of the input layer for the text vector prediction model of the source language. In these instances, the output layer is text vectors of the text to be translated.

In addition, the computing device may designate word vectors corresponding to individual words of the pending candidate translations as variables of the input layer for the text vector prediction model of the target language. In these instances, the output layer is text vectors of the pending candidate translations.

In implementations, if the computing device is not able to acquire individual words of the text to be translated directly or individual words of the pending candidate translations, the computing device may perform the following operations prior to operation of S303.

At S302, the computing device may parse the text to be translated, acquire the words of the text to be translated and/or parse the pending candidate translations, and acquire the words of the pending candidate translations.

For example, the computing device may perform segmentation to words of the Chinese text for text in Chinese. For text in English, the computing device may obtain the words directly.

In the present disclosure, the predetermined text vector prediction model of the source language and predetermined text vector prediction model of the target language are two components of the bilingual text vector prediction model, which is learned using a machine learning algorithm and obtained from the parallel corpus.

Figure 4:
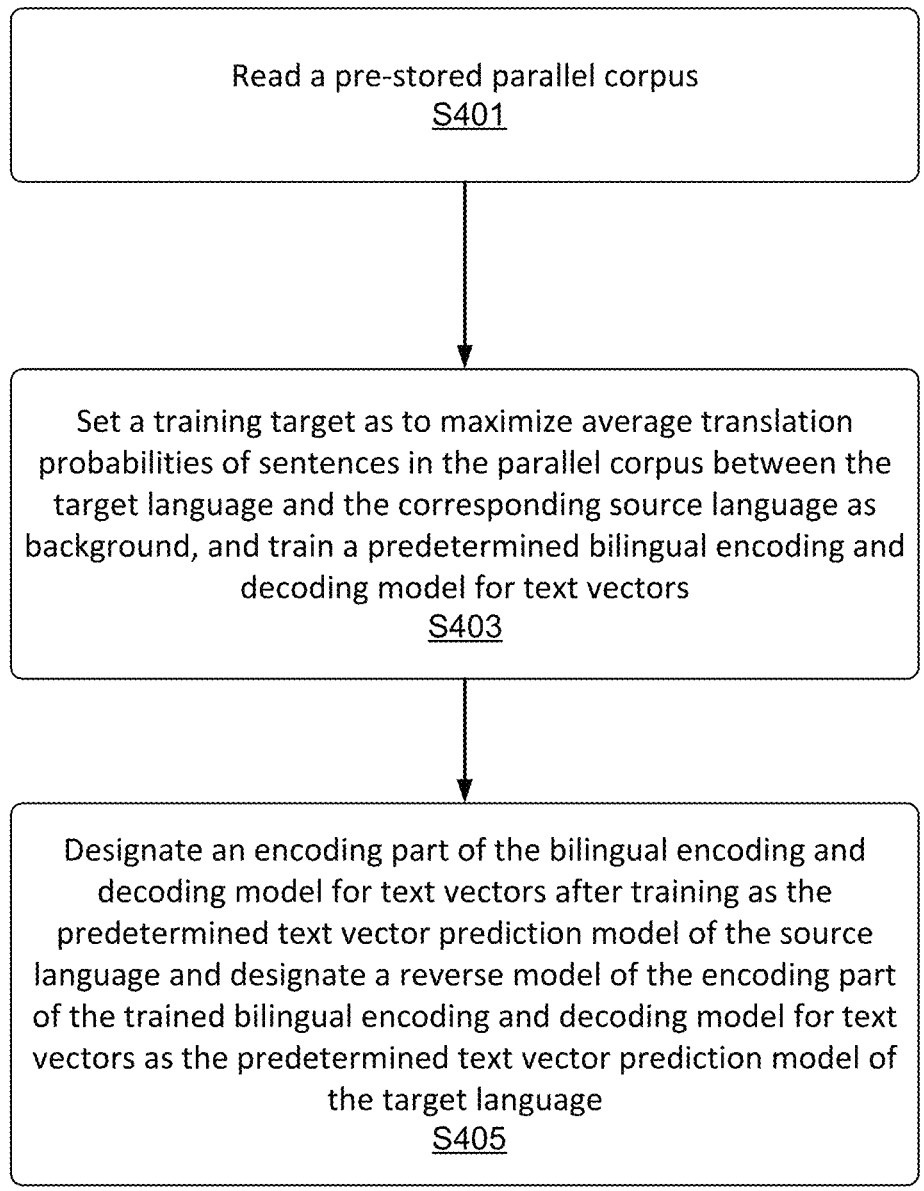
FIG. 4 is a flow chart of an illustrative process for generating predetermined text vector prediction models of the target language and the source language.

As illustrated, FIG. 4 is a flow chart of an illustrative process for generating predetermined text vector prediction models of the target language and the source language. In implementations, the predetermined text vector prediction models of the target language and the source language are generated by performing the following operations.

At S401, the computing device may read a pre-stored parallel corpus. In the present disclosure, the parallel corpus Includes a large number of parallel corpus, wherein each pair of parallel corpus includes a source language sentence and a target language sentence. These two sentences translate each other. Currently, there are a large number of parallel corpus available for download online. Searching for target areas (e.g., medical therapy, news, etc.) of the parallel corpus is an important way to improve the performance of the statistical machine translation system in specific areas.

At S403, the computing device may set a training goal so as to maximize average translation probabilities of sentences in the parallel corpus between the target language and the corresponding source language as background, and train a predetermined bilingual encoding and decoding model for text vectors.

In implementations, the bilingual prediction model for text vectors is a bilingual encoding and decoding model for text vectors. In the present disclosure, the predetermined bilingual encoding and decoding model for text vectors may be a forward neural network-based model (FFNN) and/or a recurrent neural network-based model (RNN). A forward neural network can only be considered within the context within a window. As compared to the forward neural network, the recurrent neural network can take into account more context, and hidden layers of the recurrent neural network can cover all preamble words of the current word. In the sequence data, recurrent neural networks can discover more patterns between words.

For a bilingual text vector prediction model based on a forward neural network, the computational complexity is lower than a bilingual text vector prediction model based on a recurrent neural network. However, for the bilingual text vector prediction model based on a recurrent neural network, the accuracy is higher than a bilingual text vector prediction model based on a forward neural network. In implementations, the computing device may choose one of the above text vector prediction models based on specific needs. Various ways described above of bilingual text vector prediction models merely change the way of specific embodiments, do not deviate from the core of the present disclosure, and are within the scope of the present disclosure. To improve accuracy, the implementations of the present disclosure adopt the bilingual text vector prediction model based on a recurrent neural network.

Figure 5:
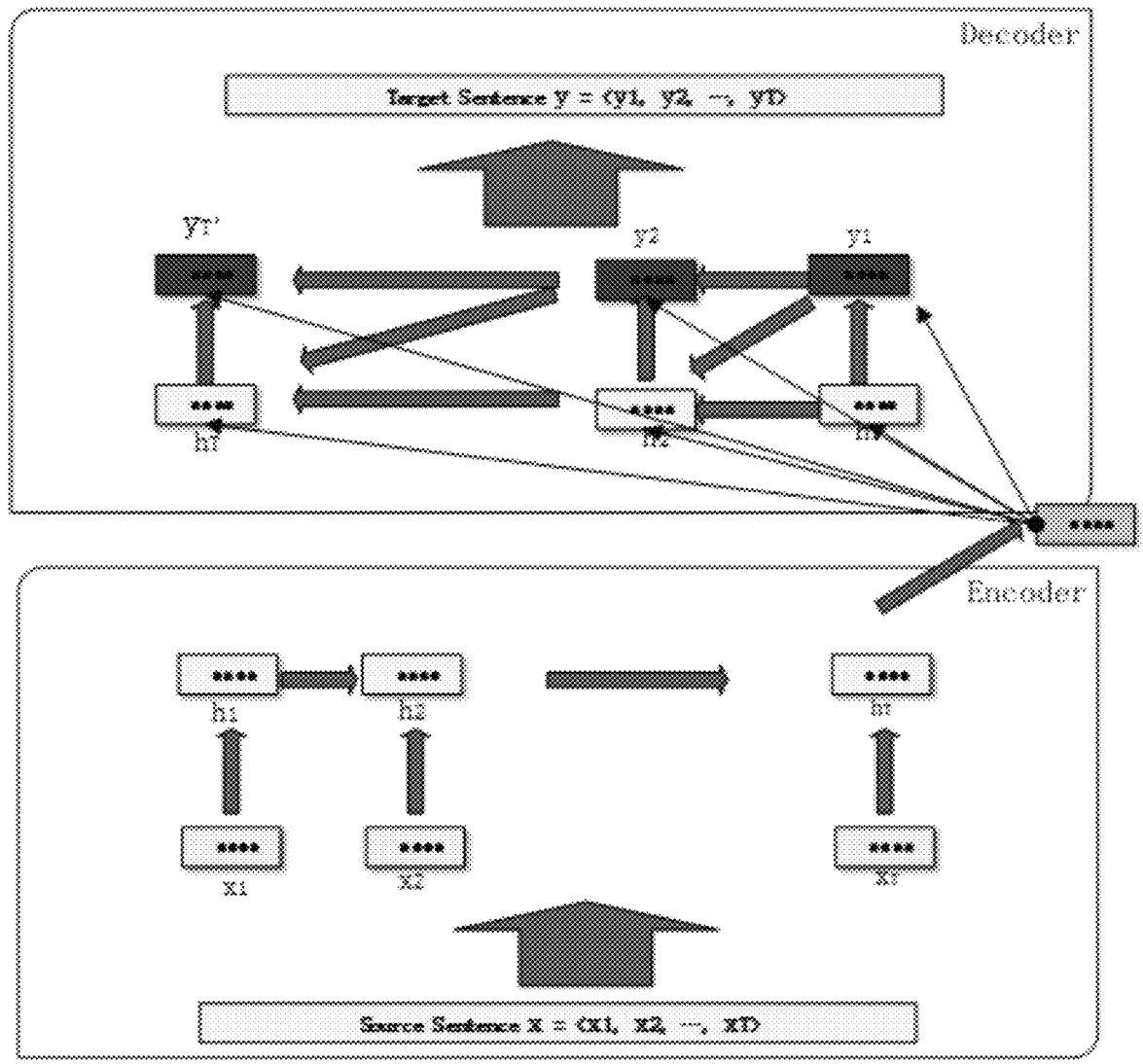
FIG. 5 is a diagram illustrating a bilingual text vector prediction model.

As illustrated, FIG. 5 is a diagram illustrating a bilingual text vector prediction model. In implementations, the predetermined bilingual encoding and decoding model for text vectors is a bilingual encoding and decoding model for text vectors based on a recurrent neural network. An input layer of the bilingual encoding and decoding model for text vectors may include words of sentences of the source language and the word vectors corresponding to the words of the sentences of the source language, and an output layer of the bilingual encoding and decoding model for text vectors may include words of sentences of the target language and word vectors corresponding to the words of the sentences of the target language. The input layer of the encoding part may include text vectors of the sentences of the source language, and the text vectors of the sentences of the source language may include the input layer of the encoding part.

In implementations, word vectors are byproducts produced in training of the bilingual text vector prediction model. In other words, when learning the bilingual encoding and decoding model for text vectors, the computer may learn word vectors having bilingual semantic features. Accordingly, prior to operation S403, the computing device may perform the following operations. 1) The computing device may parse the sentences in the parallel corpus, acquiring words of the source language and words of the target language in the parallel corpus. 2) The computing device may further set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

1) The computing device may parse the sentences in the parallel corpus and acquire words of the source language and words of the target language in the parallel corpus.

The computing device may generate a correspondence relationship between words of a source language and word vectors and a correspondence relationship between words of a target language and word vectors. First, the computing device may obtain word of the source language and words of the target language in the parallel corpus. Thus, the computing device may parse sentences in the parallel corpus and acquire the words of the source language and words of the source language in the parallel corpus. For example, the computing device may parse the sentences in the parallel corpus by performing segmentation on sentences in Chinese and by performing morpheme segmentation on sentences in English.

2) The computing device may set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

Because word vectors are byproducts produced in training the bilingual text vector prediction model, the computing device may set an initial word vector for the word after extracting each word of the parallel corpus.

In fact, the above two steps may be performed before operation S403. By the steps above, the computing device may acquire the words of the source language and words of the source language in the parallel corpus and initialize a word vector for each word. Then, the computing device may perform operation S403 to train the bilingual text vector prediction model and implement machine learning algorithms. The computer may learn word vectors having bilingual semantic features during learning the bilingual encoding and decoding model for text vectors.

By performing operation S403, the computing device may gradually adjust various parameters of the predetermined bilingual encoding and decoding model for the text vectors during the training of the predetermined bilingual encoding and decoding model for the text vectors. For example, the parameters may include connection weights. When the training reached the goal, the computing device may obtain a final correspondence relationship between words and word vectors as well as the text vector prediction models of the target language and the source language.

Figure 6:
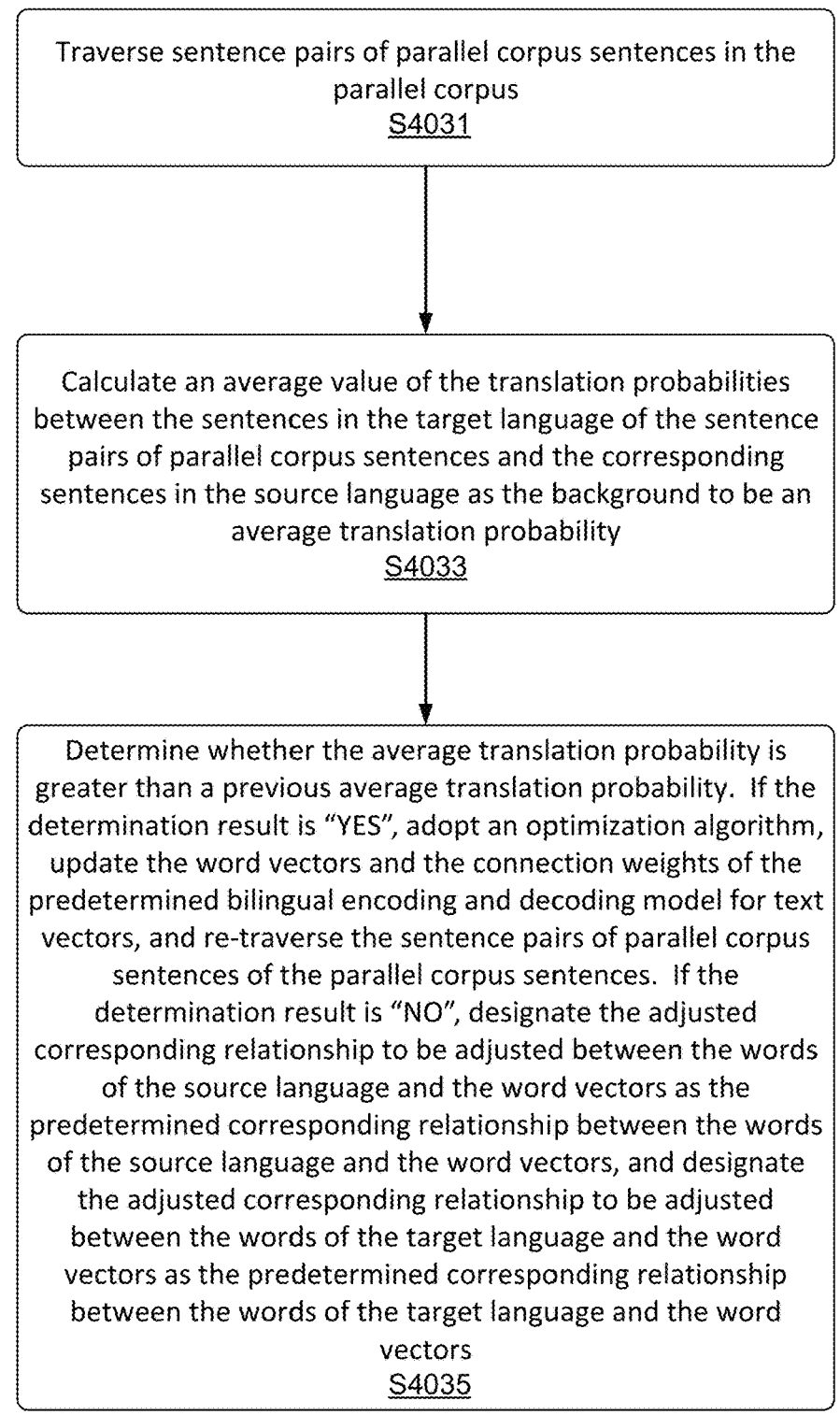
FIG. 6 is a flow chart of an illustrative process for the operation S403 as described in FIG. 4.

As illustrated, FIG. 6 is a flow chart of an illustrative process for operation S403 as described in FIG. 4. In implementations, operation S403 may include the following operations.

At S4031, the computing device may traverse sentence pairs of parallel corpus sentences in the parallel corpus. The computing device may calculate translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vector.

The implementations relate to a method for generating candidate translations. The computing device may provide the predetermined bilingual encoding and decoding model for the text vectors. Through iterative learning, the computing device may then learn the bilingual encoding and decoding model for text vectors and parameters associated with the bilingual encoding and decoding model for text vectors. During the training, the computing device may set a training goal as to maximize average translation probabilities of sentences in the parallel corpus between the target language and the corresponding source language as background. Accordingly, in each iteration, the computing device may calculate translation probabilities between sentences of the target language of the sentence pairs of parallel corpus sentences and corresponding sentences in the source language as the background.

In implementations, the translation probabilities between sentences of the target language of the sentence pairs of parallel corpus sentences and corresponding sentences in the source language as the background may be calculated using an equation:

$$p(y|x) = \Pi_{t=1}^{T_y} p(y_t | \{y_1, y_2, \ldots, y_{t-1}\}, c),$$

wherein x is a vector sequence of the sentences in the source language, $x=(x_1, x_2, \ldots, x_{T_x})$, y is a vector sequence of the sentences in the target language, $y=(y_1, y_2, \ldots, y_{T_y})$; c is the text vector of the sentences in the source language and is formed by each hidden state of timings in the encoding parts, $c=q(\{h_1, h_2, \ldots, h_{T_x}\})$, $h_t$ indicates the hidden state of timing t of the encoding parts and relates to a current word and a previous hidden state of a sentence in the source language, $h_t=f(x_t, h_{t-1})$, $p(y_t|\{y_1, y_2, \ldots, y_{t-1}\}, c)$ is a text vector of the sentence in the source language and a likelihood probability of $y_t$ in the background of $\{y_1, y_2, \ldots, y_{t-1}\}$ and relates to a previous word of the sentence in the target language, a current hidden state, and the text vector of the sentence in the source language, $p(y_t|\{y_1, y_2, \ldots, y_{t-1}\}, c)=g(y_{t-1}, s_t, c)$, $s_t$ indicates the hidden state of timing t of the decoding parts and relates to the previous word of the sentence in the target language, the previous hidden state, and a text vector of the sentence in the source language, $s_t=f(y_{t-1}, s_{t-1}, c)$, and f and g are non-linear activation functions.

In implementations, an activation function of neural network nodes may be as a symbol, S-type (sigmoid) function, hyperbolic tangent function or a linear function. In the present disclosure, the predetermined bilingual encoding and decoding model for text vectors refers to a pre-designed topology and node activation function of a neural network model. In these instances, each connection weight may be considered as a parameter class of the bilingual text vector prediction model for text vectors. The connection weights may continuously be trained during the training until reaching the training goal to obtain the final connection weights for prediction. It should be noted that, the computing device may pre-set an initial value for each of connection weights during the training. In implementations, the computing device may randomly pre-set the initial value for each of connection weights.

As illustrated in FIG. 5, the computing device may represent the word sequence as a sequence of word vectors for an encoding part of the bilingual encoding and decoding model for text vectors after reading in a word sequence (i.e., source language text), namely $x=(x_1, x_2, \ldots, x_{T_x})$. During designing the encoding part, a hiding state of timing t may be calculated using the following formula: $h_t=f(x_t, h_{t-1})$, and the text vector of the text in the source language is formed by each hidden state of timings in the encoding part, namely $c=q(\{h_1, h_2, \ldots, h_{T_x}\})$. Accordingly, the text vector of the text in the source language is a vector formed by each hidden state h in the encoding part, and f and q are non-linear activation function.

For the encoding part of the bilingual encoding and decoding model for text vectors, the computing device may designate the text vector of the text in the source language as variables of the input layer for the text vector prediction model of the source language. Further, for the predicted word $\{y_1, y_2, \ldots, y_{t-1}\}$, the computing device may continue to predict $y_t$ based on the encoding part of the neural network topology. In other words, the encoding part may be used to calculate a translation probability of sentence y in the target language.

It should be noted that the hiding state of each of the timings of the encoding part may be determined based on a word vector of a word of a current timing in the source language text and the last timing in the source language and a hiding state corresponding to the last timing. Further, the hiding state of each of the timings of the encoding part may be determined based on hiding states corresponding to the word vector $y_{t-1}$ of the source language text that is generated in the last operation and the last timing $s_{t-1}$; and the word vector $y_{t-1}$ is generated based on a word vector $y_{t-2}$ of a previous target language segment and the current hiding state $s_{t-1}$.

As illustrated in the above formula, conversions between each type of states of the bilingual text vector encoding and decoding model are a matrix multiplication operation, specific rules of the operation are determined by an activation function, and each dimension value is a parameter of the model (i.e., a connection weight).

At S4033, the computing device may calculate an average value of the translation probabilities between the sentences in the target language of the sentence pairs of parallel corpus sentences and the corresponding sentences in the source language as the background to be an average translation probability.

In each iteration, the computing device may calculate an average value of the translation probabilities between the sentences in the target language of the sentence pairs of parallel corpus sentences and the corresponding sentences in the source language as the background to be an average translation probability prior to calculating translation probabilities between sentences of the target language of the sentence pairs of parallel corpus sentences and corresponding sentences in the source language as the background.

In implementations, an average probability of translation is formalized as:

$$J = \frac{1}{N} \sum_1^N \log(p_\theta(y_n|x_n)),$$

wherein J is the average probability of translation, N is the number of sentence pairs of the parallel corpus, $x_n$ is the word vector sequence of sentences in the source language, $y_n$ is the word vector sequence of sentences in the target language, $p_\theta(y_n|x_n)$ represents the translation probability of the target language sentence $y_n$ and the corresponding source language sentence as the background, θ represents all parameters of the bilingual text vector encoding and decoding model. In implementations, θ includes each connection weight of the bilingual text vector encoding and decoding model, word vectors of the source language sentences, and word vectors of the target language sentences.

At S4035, the computing device may determine whether the average translation probability is greater than a previous average translation probability.

If the determination result is "YES", the computing device may adopt an optimization algorithm, update the word vectors and the connection weights of the predetermined bilingual encoding and decoding model for text vectors, and re-traverse the sentence pairs of parallel corpus sentences of the parallel corpus sentences.

If the determination result is "NO", the computing device may designate the adjusted correspondence relationship to be adjusted between the words of the source language and the word vectors as the predetermined correspondence relationship between the words of the source language and the word vectors, and designate the adjusted correspondence relationship to be adjusted between the words of the target language and the word vectors as the predetermined correspondence relationship between the words of the target language and the word vectors.

Operations S4031 and S4033 belong to a training period. It may take multiple training periods for training the bilingual encoding and decoding model for text vectors, for example, a few hundreds. A condition for stopping training of the model is to achieve training objectives, namely maximizing the translation probability. The computing device may compare a current average translation probability with a previous average translation probability. In response to a determination that the average translation probability is greater than the previous average translation probability, the computing device may determine that model parameters may be further optimized and that there is a need to continue training of the model to achieve the training objectives. The computing device may adopt an optimization algorithm to update word vectors and connection weights of the bilingual encoding and decoding model for text vectors and then to return to operation S4031 to start the next iteration. Otherwise, in response to a determination that the average translation probability is less than the previous average translation probability, the computing device may determine the objectives are achieved and stop the training. After the training, the bilingual encoding and decoding model for text vectors is the model that has been found via the parallel corpus to describe variation of response variables in the parallel corpus (i.e., output layer variables) that are impacted by predictor variables (i.e., input layer variables).

Algorithms of adjustment of the various parameters of the bilingual text vector encoding and decoding model for text vectors include an error feedback method, a gradient method, a Newton type algorithm, a Levenberg-Marquardt algorithm, and a genetic algorithm. These different ways of optimization merely change the way of specific embodiments, do not deviate from the core of the present disclosure, and are within the scope of the present disclosure.

In implementations, the optimization algorithm may include a stochastic gradient algorithm. In these instances, the adopting an optimization algorithm and updating the word vectors and the connection weights of the predetermined bilingual encoding and decoding model for text vectors may be implemented by the following operations. 1) The computing device may calculate the word vectors and a gradient of the connection weights of the predetermined bilingual encoding and decoding model for text vectors based on a predetermined learning rate and an equation of the average translation probability; 2) the computing device may update the word vectors and the connection weights of the predetermined bilingual encoding and decoding model for text vectors based on the word vectors and the a gradient of the connection weights of the predetermined bilingual encoding and decoding model for text vectors.

The computing device may adopt a stochastic gradient algorithm, and the gradient may be updated using the following rule:

$$\theta \leftarrow \theta + \epsilon \frac{\partial(\log(p_\theta(y_n|x_n)))}{\partial \theta},$$

wherein $\theta$ represents values for the various parameters, and $\epsilon$ is the learning rate.

In the present disclosure, the learning rate decides each cycle parameter variation arising from the training. Greater learning rate may lead to instability of the system, while lower learning rate may result in a longer training time, slow convergence, and trend of maximization of the average translation probability. Therefore, under normal circumstances, the computing device may choose a relatively low learning rate to ensure the stability of the system. For example, the learning rate may be chosen between 0.01-0.8.

In implementations, the bilingual encoding and decoding model for text vectors is a complex network, which may require different learning rates in different parts of the surface of the objective function. To reduce the number of training and training time for searching learning rates, a more appropriate approach is to use an adaptive learning rate to make the training of the network using different learning rates in different learning states.

By the above-described operation S403, the computing device may obtain a trained bilingual encoding and decoding model for text vectors and word vectors having bilingual semantic features.

At S405, the computing device may designate an encoding part of the bilingual encoding and decoding model for text vectors after training as the predetermined text vector prediction model of the source language and designate a reverse model of the encoding part of the trained bilingual encoding and decoding model for text vectors as the predetermined text vector prediction model of the target language.

In the present disclosure, an input variable of the text vector prediction model of the source language is the sequence of word vectors of the source language text, and the output layer is the text vector of the source language text. The text vector prediction model of the source language text is a component of the bilingual encoding and decoding model for text vectors and corresponds to the encoding part. After generating the bilingual encoding and decoding model for text vectors via the training, the computing device may designate the model of the encoding part directly as the text vector prediction model of the source language text. An input variable of the text vector prediction model of the target language is the sequence of word vectors of the target language text, and the output layer is the text vector of the target language text. The text vector prediction model of the target language text is a component of the bilingual encoding and decoding model for text vectors, and corresponds to the encoding part. After generating the bilingual encoding and decoding model for text vectors via training, the computing device may designate the model of the encoding part directly as the text vector prediction model of the target language text.

For above described operations S401 to S405, the computing device may perform these operations to generate the predetermined text vector prediction models of the target language and the source language.

At S203, the computing device may calculate distances between the text vector of the text to be translated and the text vectors of the pending candidate translations and use the distances to be the degrees of semantic similarity of the text to be translated and the pending candidate translations.

The computing device may implement the operation S201 to generate the text vector of the text to be translated and the text vectors of the pending candidate translations to measure the distance between the text vectors to use the distance as the degrees of semantic similarity of the text to be translated and the pending candidate translations. In implementations, the computing device may use the Euclidean distance or cosine angle distance as the distances between the text vectors.

After obtaining features having impacts on translation probabilities of the pending candidate translations, the computing device may generate the translation probabilities from the text to be translated to the pending candidate translations based on the features having impacts on translation probabilities of the pending candidate translations, and a predetermined translation probability prediction model.

In the present disclosure, the predetermined translation probability prediction model refers to a translation probability prediction model that is learned from a pre-stored parallel corpus via a machine learning algorithm. In implementations, the machine learning algorithm may be employed include a linear regression algorithm, a regression tree algorithm or an iterative decision tree algorithm. Different algorithms may generate translation probabilities with different accuracies, and computational complexity levels of different algorithms are not the same. In implementations, the computing device may choose any machine learning algorithm to generate the translation probability prediction model.

In implementations, a translation probability prediction model may be learned from a pre-stored parallel corpus using a linear regression algorithm. In translation probability prediction models based on linear regression, each feature having impact on the translation probability has a weight. These weights are used to control influence of different features on the translation probability from source language text to target language text.

For a statistics-based machine translation system, the parallel corpus can be divided into three parts: the first part used for word alignment and phrase extraction, the second part used for training of the translation probability prediction model, the third part used for system evaluation. In these instances, for the data of the second and third parts, each source language sentence may have multiple candidate translations.

In implementations, the computing device may utilize the minimum rate of error training algorithm by data of the second part as described above (e.g., a Tuning Set) to optimize weights of the features such that a given optimization criterion is optimized. General common optimization criteria include information entropy, BLEU, TER et al. This stage requires a decoder for decoding multiple optimization sets. Each decoding produces M highest-scoring results, and the computing device may adjust the weight of each feature. Ranking of N results may change when the weight is adjusted. Further, the highest score is the result of the decoding and will be used to calculate a BLEU score or TER. The computing device may improve the score of the entire set of optimizations have been improved and perform next decoding when obtaining a new set of weights. And the computing device may perform the above operations until new improvement may not be able to observe.

In implementations, depending on selected values for a size of the optimization set, a model size and a speed of the decoder, training time may take hours or days. Using weights of features, a translation system may score higher and higher with respect to objective evaluation criteria. Meanwhile, the translation system needs continuously improve the objective evaluation criteria so that objective evaluation criteria and subjective evaluation criteria are closer and closer.

During the actual process of translation, according to specific needs, the computing device may select a random combination of the features having the impacts on the translation probabilities and determine a characteristic of the weights, calculation a translation probability of each pending candidate translation from the text to be translated.

At S105, the computing device may select a predetermined number of pending candidate translations that have the translation probabilities higher than other pending candidate translations in the pending candidate translations to be the candidate translations of the text to be translated.

After obtaining the translation probability from the text to be translated to each of the pending candidate translations at S103, the computing device may select a predetermined number of pending candidate translations that have the translation probabilities higher than other pending candidate translations in the pending candidate translations to be the candidate translations of the text to be translated. In implementations, the computing device may set a number of the pending candidate translations. The larger the preset number is, the greater a Pruning Intensity of the pending candidate translation corresponding to the text to be translated is. The smaller preset number is, the smaller the Pruning Intensity of the pending candidate translation corresponding to the text to be translated is.

The above described implementations relate to a method for generating candidate translations. Correspondingly, the implementations relate to a device for generating candidate translations. The device corresponds to the method described above.

Figure 7:
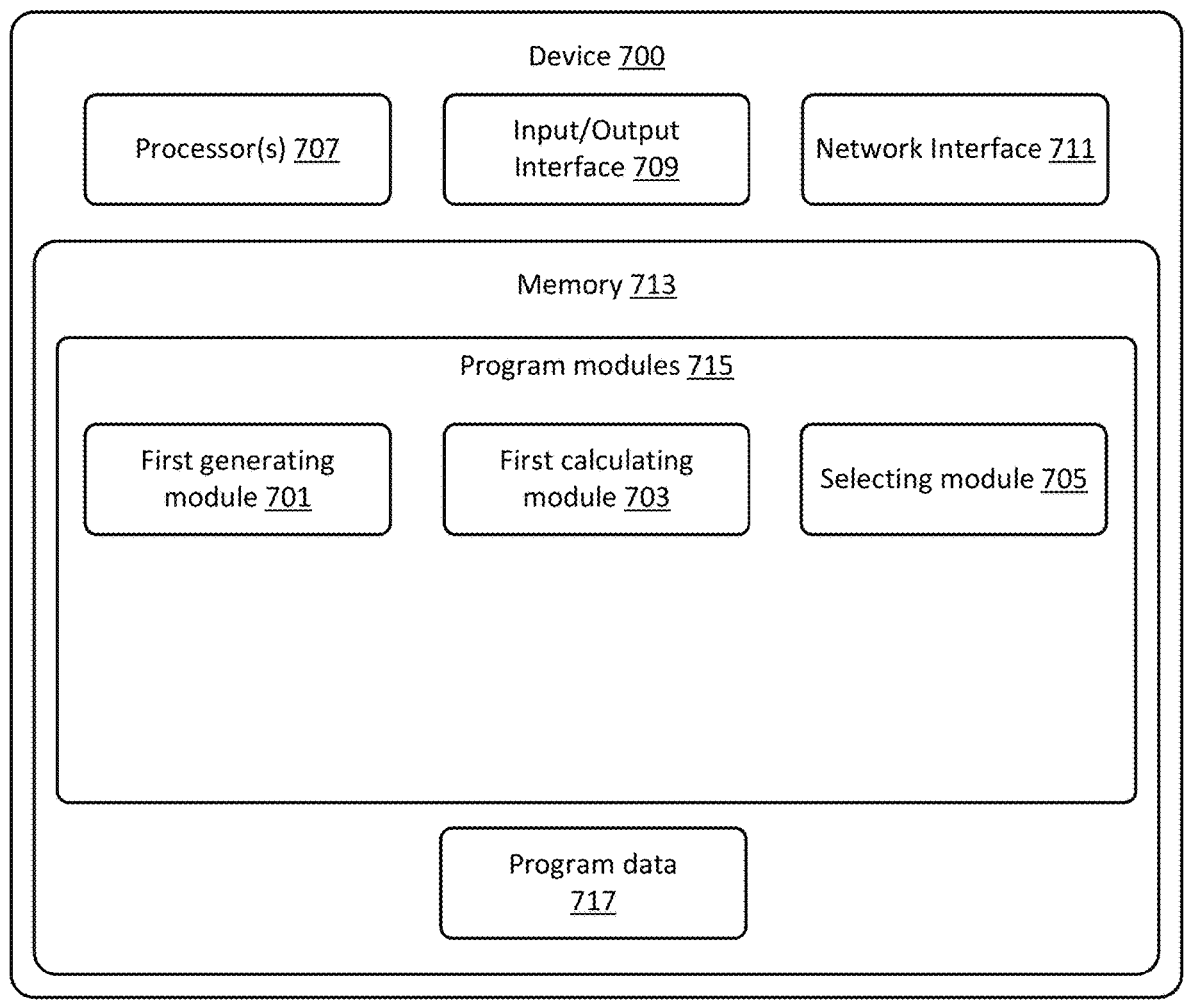
FIG. 7 is a schematic diagram of an illustrative computing device that enables generation of candidate translations.

As illustrated, FIG. 7 is a schematic diagram of an illustrative computing device that enables generation of candidate translations. Since the apparatus of the embodiment is substantially similar to the method as described above, the following description of the implementations are merely illustrative.

The implementations relate to a device 700 for generating candidate translations for a statistics-based machine translation system. The device 700 may include a first generating module 701 configured to generate pending candidate translations of text to be translated based on predetermined translation rules.

The device 700 may further include a first calculating module 703 configured to generate the translation probabilities from the text to be translated to the pending candidate translations based on features having impacts on translation probabilities of the pending candidate translations and a predetermined translation probability prediction model.

The device 700 may further include a selecting module 705 configured to select a predetermined number of pending candidate translations that have the translation probabilities higher than other pending candidate translations in the pending candidate translations to be the candidate translations of the text to be translated.

In these instances, the features having impacts on the translation probabilities may include degrees of semantic similarity between the text to be translated and the candidate translations.

In implementations, the first generating module 701 may include a determining sub-module configured to determine whether a translation rule of the predetermined translation rules is applicable to the text to be translated for each translation rule of the predetermined translation rules.

The first generating module 701 may include a generating sub-module generate a pending candidate translation of the text to be translated based on the translation rule if the determination result is "YES".

In implementations, the device 700 may further include one or more processors 707, an input/output (I/O) interface 709, a network interface 711 and memory 713.

The memory 713 may include a form of computer-readable media, e.g., a non-permanent storage device, random-access memory (RAM) and/or a nonvolatile internal storage, such as read-only memory (ROM) or flash RAM. The memory 713 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 713 may include program modules 715 and program data 717. The program modules 715 may include the first generating module 701, the first calculating module 703 and the selecting module 705 as described in the foregoing description.

Figure 8:
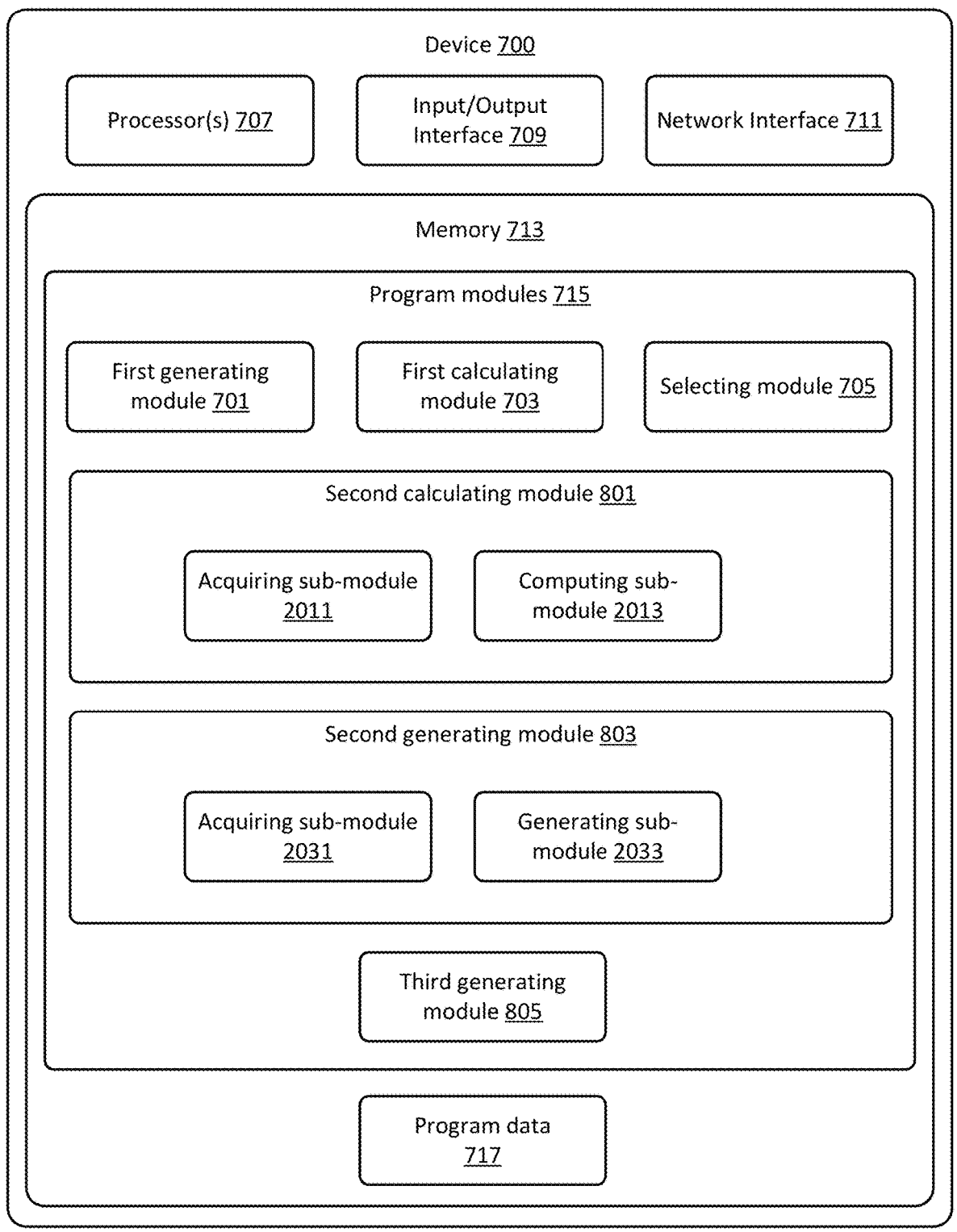
FIG. 8 is a schematic diagram of illustrative modules that enable generation of candidate translations.

As illustrated, FIG. 8 is a schematic diagram of illustrative modules that enable generation of candidate translations. In implementations, the modules 715 may further include a second calculating module 801 configured to calculate degrees of semantic similarity of the text to be translated and the pending candidate translations.

In implementations, the second computing module 801 may include an acquiring sub-module 2011 configured to obtain a text vector of the text to be translated, and text vectors of the pending candidate translations.

The second computing module 801 may include a computing sub-module 2013 configured to calculate distances between the text vector of the text to be translated and the text vectors of the pending candidate translations to be the degrees of semantic similarity of the text to be translated and the pending candidate translations.

In these instances, the text vector may include a text vector capable of showing bilingual semantic information.

In implementations, the modules 715 may further include a second generating module 803 configured to generate the text vector of the text to be translated and the text vectors of the pending candidate translations.

In implementations, the second generating module 803 may include an acquiring sub-module 2031 configured to acquire the word vectors corresponding to the words of the text to be translated based on a predetermined correspondence relationship between words of a source language and word vectors and to acquire the word vectors corresponding to the words of the pending candidate translations based on the predetermined correspondence relationship between the words of the target language and the word vectors.

The second generating module 803 may further include a generating sub-module 2033 configured to generate the text vector of the text to be translated based on the word vectors corresponding to the words of the text to be translated, and a predetermined text vector prediction model of the source language and generate the text vectors of the pending candidate translations based on the word vectors corresponding to the words of the pending candidate translations and a predetermined text vector prediction model of the target language, In these instances, the word vectors may include word vectors capable of showing bilingual semantic information.

In implementations, the second generating module 803 further may include a parsing sub-module 2030 configured to parse the text to be translated, acquire the words of the text to be translated; and/or parsing the pending candidate translations, and acquire the words of the pending candidate translations.

In implementations, the modules 715 may further include a third generating module 805 configured to generate the predetermined text vector prediction models of the target language and the source language.

Figure 9:
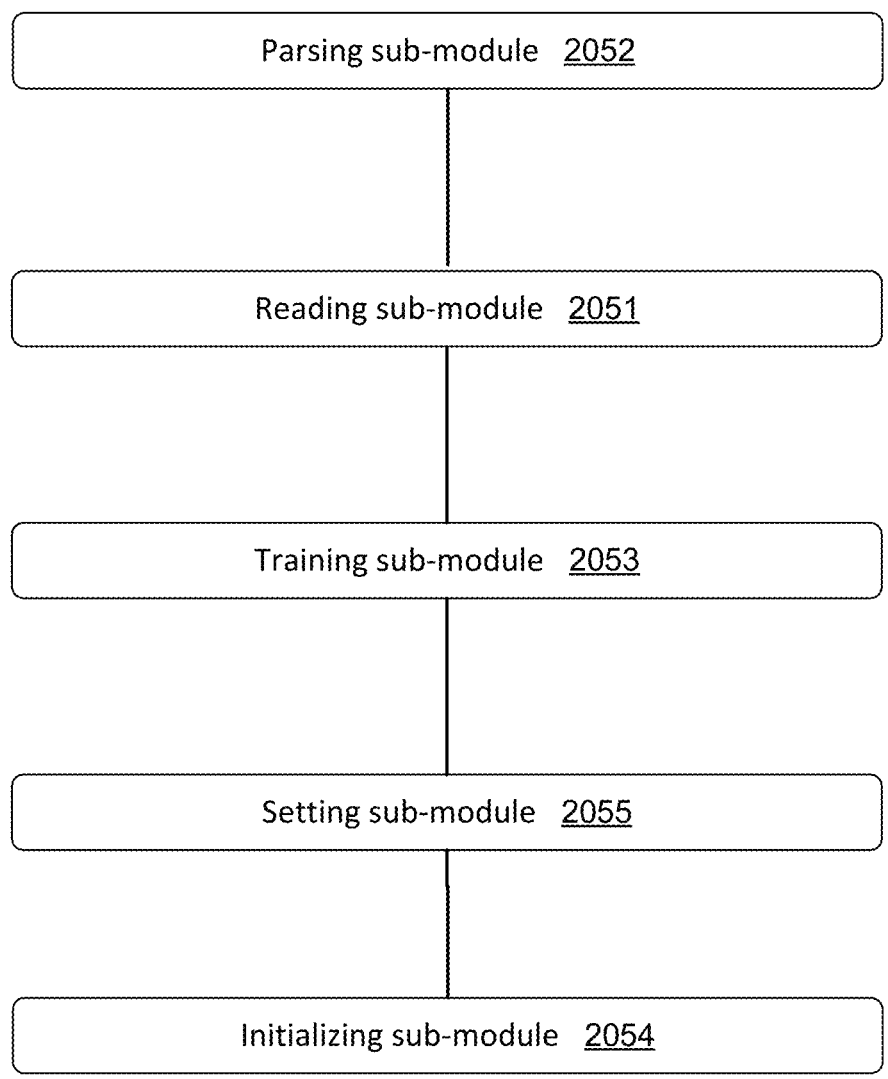
FIG. 9 is another schematic diagram of illustrative modules that enable generation of candidate translations.

As illustrated, FIG. 9 is yet another schematic diagram of illustrative modules that enable generation of candidate translations. In implementations, the third generating module 805 may further include a reading sub-module 2051 configured to read a pre-stored parallel corpus.

The third generating module 805 may further include a training sub-module 2053 configured to set a training goal as to maximize average translation probabilities of sentences in the parallel corpus between the target language and the corresponding source language as background and train a predetermined bilingual encoding and decoding model for text vectors.

The third generating module 805 may further include a setting sub-module 2055 configured to designate an encoding part of the bilingual encoding and decoding model for text vectors as the predetermined text vector prediction model of the source language, and designate a reverse model of the encoding part of the trained bilingual encoding and decoding model for text vectors as the predetermined text vector prediction model of the target language.

In these instances, an input layer of the bilingual encoding and decoding model for text vectors may include words of sentences of the source language and the word vectors corresponding to the words of the sentences of the source language, and an output layer of the bilingual encoding and decoding model for text vectors may include words of sentences of the target language and word vectors corresponding to the words of the sentences of the target language. The input layer of the encoding part may include text vectors of the sentences of the source language, and the text vectors of the sentences of the source language may include the input layer of the encoding part.

As illustrated, FIG. 9 includes a schematic diagram of the training sub-module 805 of the device for generating candidate translations. In implementations, the third generating module 805 may further include a parsing sub-module 2052 configured to parse sentences in the parallel corpus, and acquire words of the source language and words of the target language in the parallel corpus.

The third generating 805 module may further include an initializing sub-module 2054 configured to set word vectors having a first predetermined dimension for the words of the source language in the parallel corpus, form a correspondence relationship to be adjusted between the words of the source language in the parallel corpus and the word vectors, setting word vectors having a first predetermined dimension for the words of the target language in the parallel corpus, and form a correspondence relationship to be adjusted between the words of the target language in the parallel corpus and the word vectors.

Figure 10:
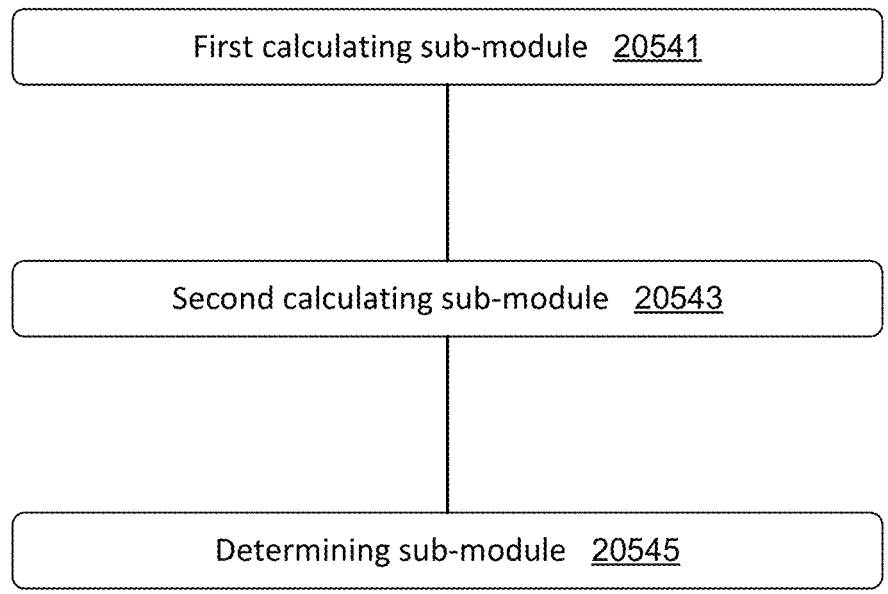
FIG. 10 is yet another schematic diagram of illustrative modules that enable generation of candidate translations.

As illustrated, FIG. 10 includes a schematic diagram of the training sub-module 2053 of the device for generating candidate translations. In implementations, the training sub-module 2053 may include a first calculating sub-module 20541 configured to traverse sentence pairs of parallel corpus sentences of the parallel corpus sentences, and calculate translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vector.

The training sub-module 2053 may further include a second calculating sub-module 20543 configured to calculate an average value of the translation probabilities between sentences in the target language of the sentence pairs of parallel corpus sentences and corresponding sentences in the source language as the background, to be an average translation probability.

The training sub-module 2053 may further include a determining sub-module 20545 configured to determine whether the average translation probability is greater than a previous average translation probability.

If the determination result is "YES", the training sub-module 2053 may adopt an optimization algorithm, updating the word vectors and the connection weights of the predetermined bilingual encoding and decoding model for text vectors, and re-traverse the sentence pairs of parallel corpus sentences of the parallel corpus sentences.

If the determination result is "NO", the training sub-module 2053 may designate the adjusted correspondence relationship to be adjusted between the words of the source language and the word vectors as the predetermined correspondence relationship between the words of the source language and the word vectors, and designate the adjusted correspondence relationship to be adjusted between the words of the target language and the word vectors as the predetermined correspondence relationship between the words of the target language and the word vectors.

Figure 11:
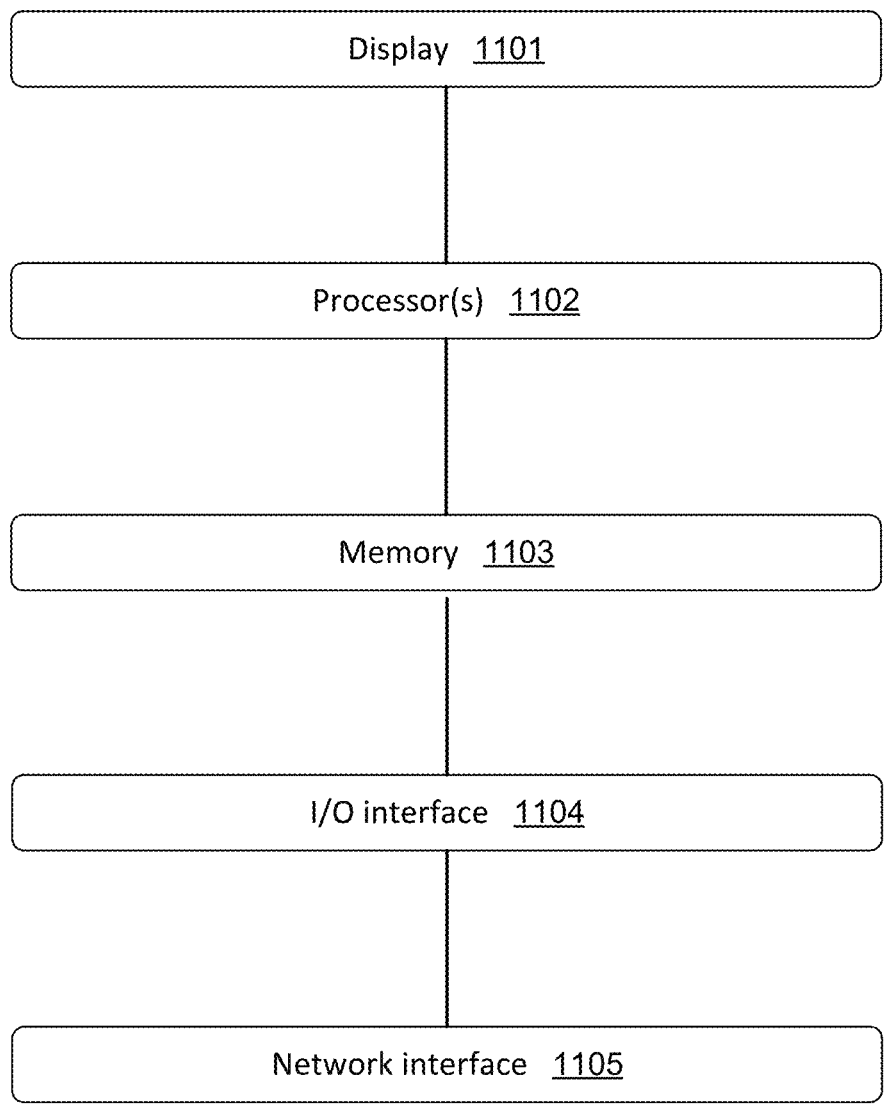
FIG. 11 is a schematic diagram of an illustrative electronic device in accordance with implementations of the present disclosure.

As illustrated, FIG. 11 is a schematic diagram of an illustrative electronic device in accordance with implementations of the present disclosure. Since the electronic device of the embodiment is substantially similar to the method as described above, the following description of the implementations are merely illustrative.

An electronic device 1100 according to the present implementations, the electronic device may include: display 1101; processor(s) 1102; and memory 1103, the memory 1103 storing a device for generating candidate translations, when the device is processed by the processor(s) 1102, performing the following operations. The electronic device may generating pending candidate translations of text to be translated based on predetermined translation rules, generate the translation probabilities from the text to be translated to the pending candidate translations based on features having impacts on translation probabilities of the pending candidate translations, and a predetermined translation probability prediction model, and select a predetermined number of pending candidate translations that have the translation probabilities higher than other pending candidate translations in the pending candidate translations to be the candidate translations of the text to be translated. In these instances, the features having impacts on the translation probabilities may include degrees of semantic similarity between the text to be translated and the candidate translations. In implementations, the device 1100 may further include an input/output (I/O) interface 1104 and a network interface 1105.

The implementations herein relate to methods and devices for generating candidate translations using a statistics-based machine translation system. A computing device may generate the translation probabilities from the text to be translated to the pending candidate translations based on features having impacts on translation probabilities of the pending candidate translations, and a predetermined translation probability prediction model. The computing device may further select a predetermined number of pending candidate translations that have the translation probabilities higher than other pending candidate translations in the pending candidate translations to be the candidate translations of the text to be translated; the features having impacts on the translation probabilities may include degrees of semantic similarity between the text to be translated and the candidate translations. The implementations enable rule-based translations of original fragments of text to reach a natural language semantic level to evaluate translation quality of the candidate translations, therefore improving quality of candidate translations.

The implementations further relate to a method for quantizing text using a computing device. The computing device may generate a text vector of the text to be translated based on the word vectors corresponding to the words of the text to be translated, and a predetermined text vector prediction model of the language corresponding to a language of the text to be quantized. In implementations, the word vectors have bilingual semantic features, which can express bilingual semantic information of word translations. The text vector prediction model corresponding to the language of the text to be translated is a component of the bilingual text vector prediction model for text vectors, and another component of the bilingual text vector prediction model is a text vector prediction model corresponding to another language corresponding to the text to be quantized. The parallel corpus may be trained to generate the bilingual text vector prediction model. The computing device may acquire a text vector of language text based on the text vector prediction model corresponding to a language of the language text in the parallel corpus as a text vector of another language text. In other words, the bilingual text vector prediction model may be obtained by training sentence pairs of the parallel corpus in the same text vector such that the text vector generated by the bilingual text vector prediction model has cross-language semantic information.

Figure 12:
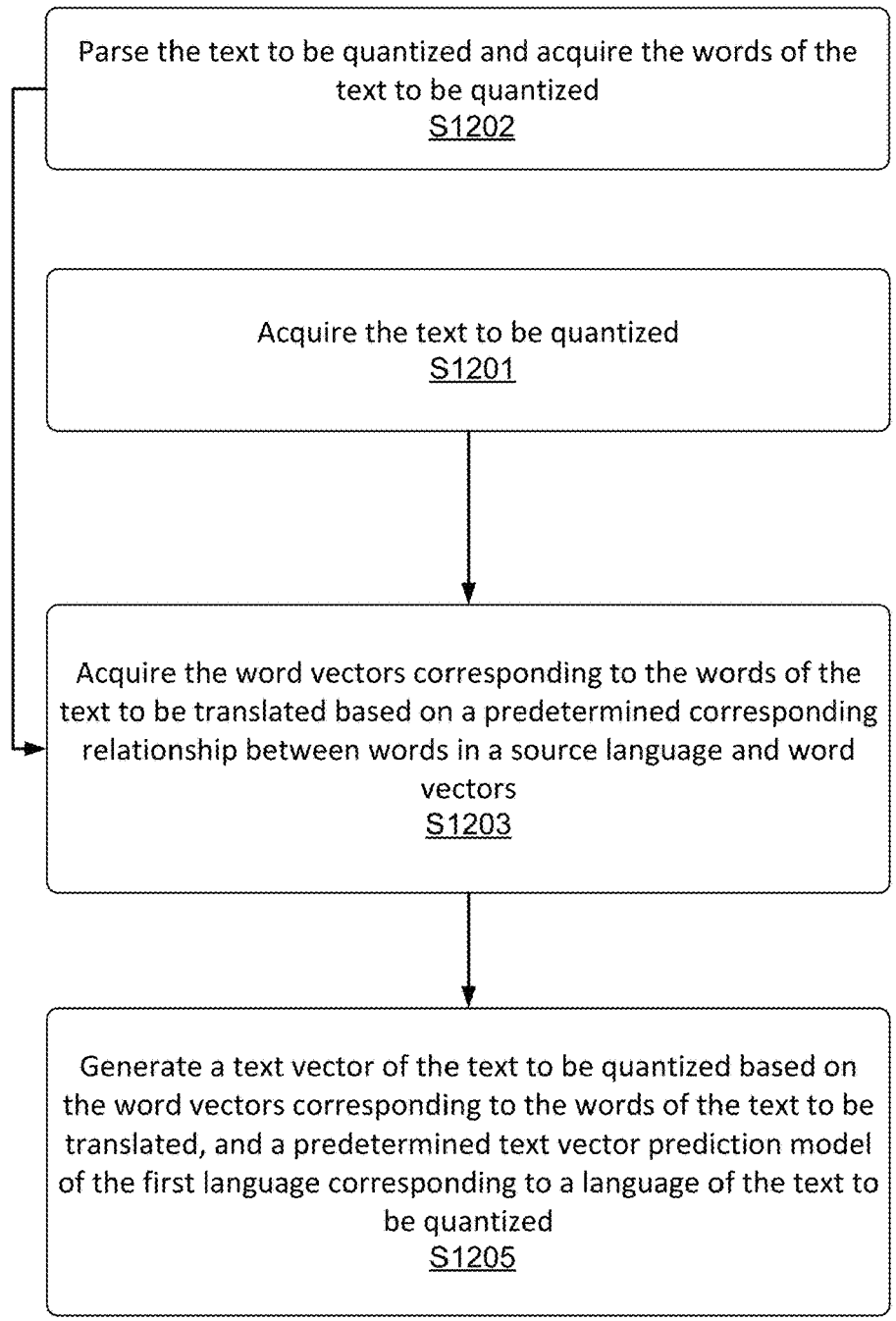
FIG. 12 is a flow chart of an illustrative process for quantizing text.

As illustrated, FIG. 12 is a flow chart of an illustrative process for quantizing text. The process may include the following operations.

At S1201, the computing device may acquire the text to be quantized. The text to be quantized in the present disclosure refers to text formed by basic unit words of natural language text, including natural language phrases, sentences or paragraphs, etc.

At S1203, the computing device may acquire the word vectors corresponding to the words of the text to be translated based on a predetermined correspondence relationship between words in a source language and word vectors.

Accordingly, the computing device may map each word of the text to be quantized $w_1, \ldots, w_t$ to a space of word vectors. The operation S1203 corresponds to the operation S301 as described above, and similarities are not mentioned here and related parts may be seen in description related to operation S301.

At S1205, the computing device may generate a text vector of the text to be quantized based on the word vectors corresponding to the words of the text to be translated, and a predetermined text vector prediction model of the first language corresponding to a language of the text to be quantized.

Accordingly, the computer device may combine the word vectors of the acquired text to be quantized to form a larger vector (i.e., the word vector sequence) as the input layer variable of the text vector prediction model of the first language text. The output layer of the text vector prediction model of the first language text is the text vector of the text to be translated.

In implementations, the computing device may perform the following operations before performing operation of S1203 if the computing device is not able to acquire individual words of the text to be quantized directly.

At S1202, the computing device may parse the text to be quantized and acquire the words of the text to be quantized. The operation S1202 corresponds to the operation S302 as described above, and similarities are not mentioned here and related parts may be seen in description related to operation S302.

In the present disclosure, the text vector prediction model corresponding to the first language text is a component of the bilingual text vector prediction model for text vectors, and the bilingual text vector prediction model also includes another component, namely a text vector prediction mode of the second language. The bilingual text vector prediction model is obtained using a machine learning algorithm by learning from the parallel corpus. In the present disclosure, each of the sentence pairs of the parallel corpus sentence includes a first language text and second language text that are translations for each other. Accordingly, the text vector generated by the bilingual text vector prediction model has cross-language semantic information.

Figure 13:
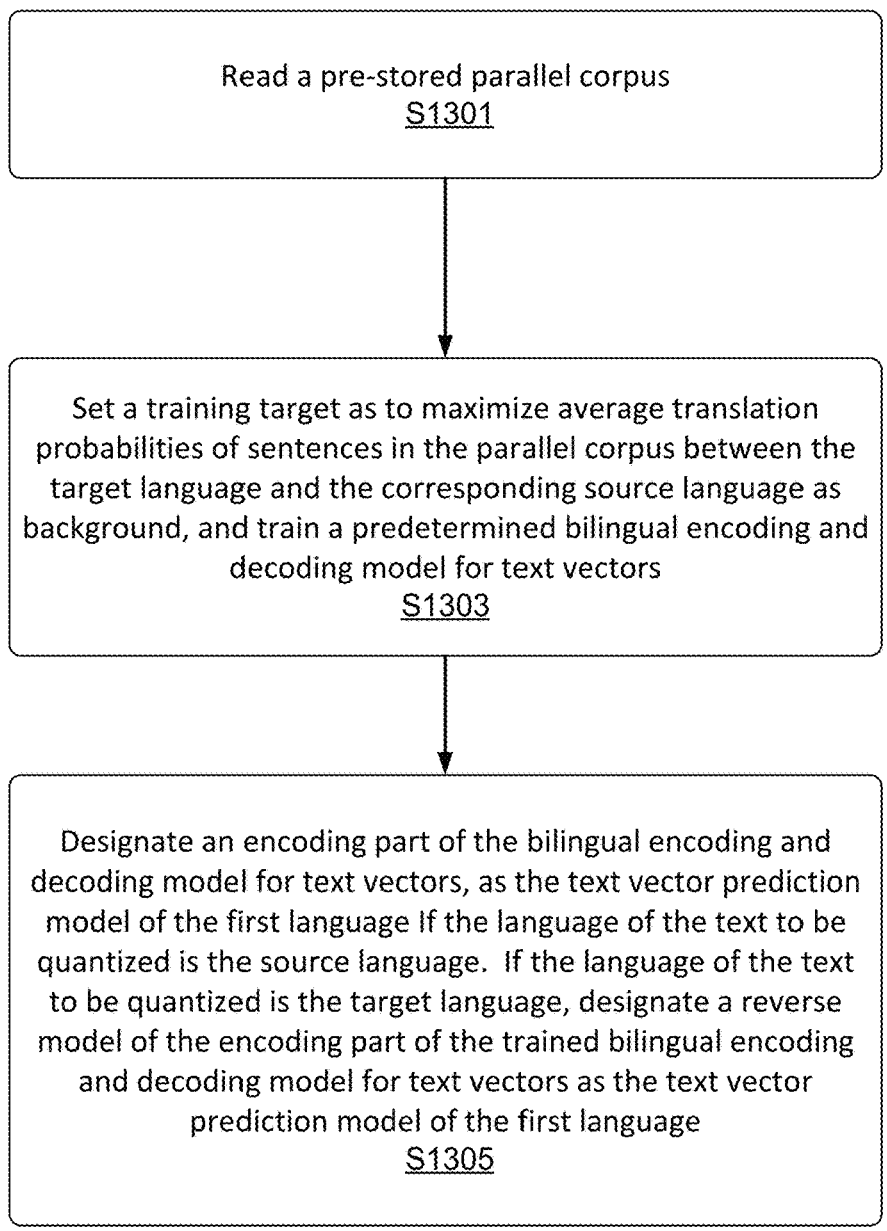
FIG. 13 is a flow chart of an illustrative process for generating a text vector prediction model for text in a first language.

As illustrated, FIG. 13 is a flow chart of an illustrative process for generating a text vector prediction model for text in a first language. In implementations, the text vector prediction mode of the first language may be generated using a computing device by the following operations:

At S1301, the computing device may read a pre-stored parallel corpus. The operation S1301 corresponds to the operation S401 as described above, and similarities are not mentioned here and related parts may be seen in description related to operation S401.

At S1303, the computing device may set a training goal as to maximize average translation probabilities of sentences in the parallel corpus between the target language and the corresponding source language as background, and train a predetermined bilingual encoding and decoding model for text vectors. The operation S1303 corresponds to the operation S403 as described above, and similarities are not mentioned here and related parts may be seen in description related to operation S403.

In implementations, word vectors are byproducts produced when training the bilingual text vector prediction model. In other words, when learning the bilingual encoding and decoding model for text vectors, the computer may learn word vectors having bilingual semantic features. Accordingly, prior to the operation S1303, the computing device may perform the following operations. 1) The computing device may parse the sentences in the parallel corpus, acquiring words of the source language and words of the target language in the parallel corpus; 2) the computing device may set word vectors having a first predetermined dimension for the words of the source language in the parallel corpus, form a correspondence relationship to be adjusted between the words of the source language in the parallel corpus and the word vectors, and set word vectors having a first predetermined dimension for the words of the target language in the parallel corpus, and form a correspondence relationship to be adjusted between the words of the target language in the parallel corpus and the word vectors.

As illustrated, FIG. 14 is a flow chart of an illustrative process for the operation S1303 as described in FIG. 13. In implementations, operation S1303 may be implemented by the following operations.

At S13031, the computing device may traverse sentence pairs of parallel corpus sentences of the parallel corpus sentence. The computing device may calculate translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vector. Operation S13031 corresponds to the operation S4013 as described above, and similarities are not mentioned here and related parts may be seen in description related to operation S4031.

At S13033, the computing device may calculate an average value of the translation probabilities between the sentences in the target language of the sentence pairs of parallel corpus sentences and the corresponding sentences in the source language as the background, to be an average translation probability. The operation S13033 corresponds to the operation S4033 as described above, and similarities are not mentioned here and related parts may be seen in description related to operation S4033.

At S13035, the computing device may determine whether the average translation probability is greater than a previous average translation probability. If the determination result is "YES", the computing device may adopt an optimization algorithm, updating the word vectors and the connection weights of the predetermined bilingual encoding and decoding model for text vectors, and re-traversing the sentence pairs of parallel corpus sentences of the parallel corpus sentences.

At S13037, if the determination result is "NO", the computing device may designate the adjusted correspondence relationship to be adjusted between the words of the source language and the word vectors as the predetermined correspondence relationship between the words of the source language and the word vectors If the language of the text to be quantized is the source language. If the language of the text to be quantized is the target language, the computing device may designate the adjusted correspondence relationship to be adjusted between the words of the target language and the word vectors as the predetermined correspondence relationship between the words of the target language and the word vectors. Operations S13035 and S13037 corresponds to the operation S4035 as described above, and similarities are not mentioned here and related parts may be seen in description related to operation S4035.

In implementations, the optimization algorithm may include a stochastic gradient algorithm. The adopting an optimization algorithm and updating the word vectors and the connection weights of the predetermined bilingual encoding and decoding model for text vectors may be implemented by the following operations. 1) The computing device may calculate the word vectors and a gradient of the connection weights of the predetermined bilingual encoding and decoding model for text vectors based on a predetermined learning rate and an equation of the average translation probability; 2) the computing device may update the word vectors and the connection weights of the predetermined bilingual encoding and decoding model for text vectors based on the word vectors and the a gradient of the connection weights of the predetermined bilingual encoding and decoding model for text vectors.

At S1305, the computing device may designate an encoding part of the bilingual encoding and decoding model for text vectors, as the text vector prediction model of the first language If the language of the text to be quantized is the source language. If the language of the text to be quantized is the target language, the computing device may designate a reverse model of the encoding part of the trained bilingual encoding and decoding model for text vectors as the text vector prediction model of the first language.

Operation S1305 corresponds to the operation S405 as described above, and similarities are not mentioned here and related parts may be seen in description related to operation S405.

The computing device may generate a text vector prediction model of the first language, and a correspondence relationship between words and word vectors for the above described operations S1301 to S1305.

The above described implementations for quantification of text, Correspondingly, the implementations further relate to a device for quantizing text. The device corresponds to the method described above.

Figure 15:
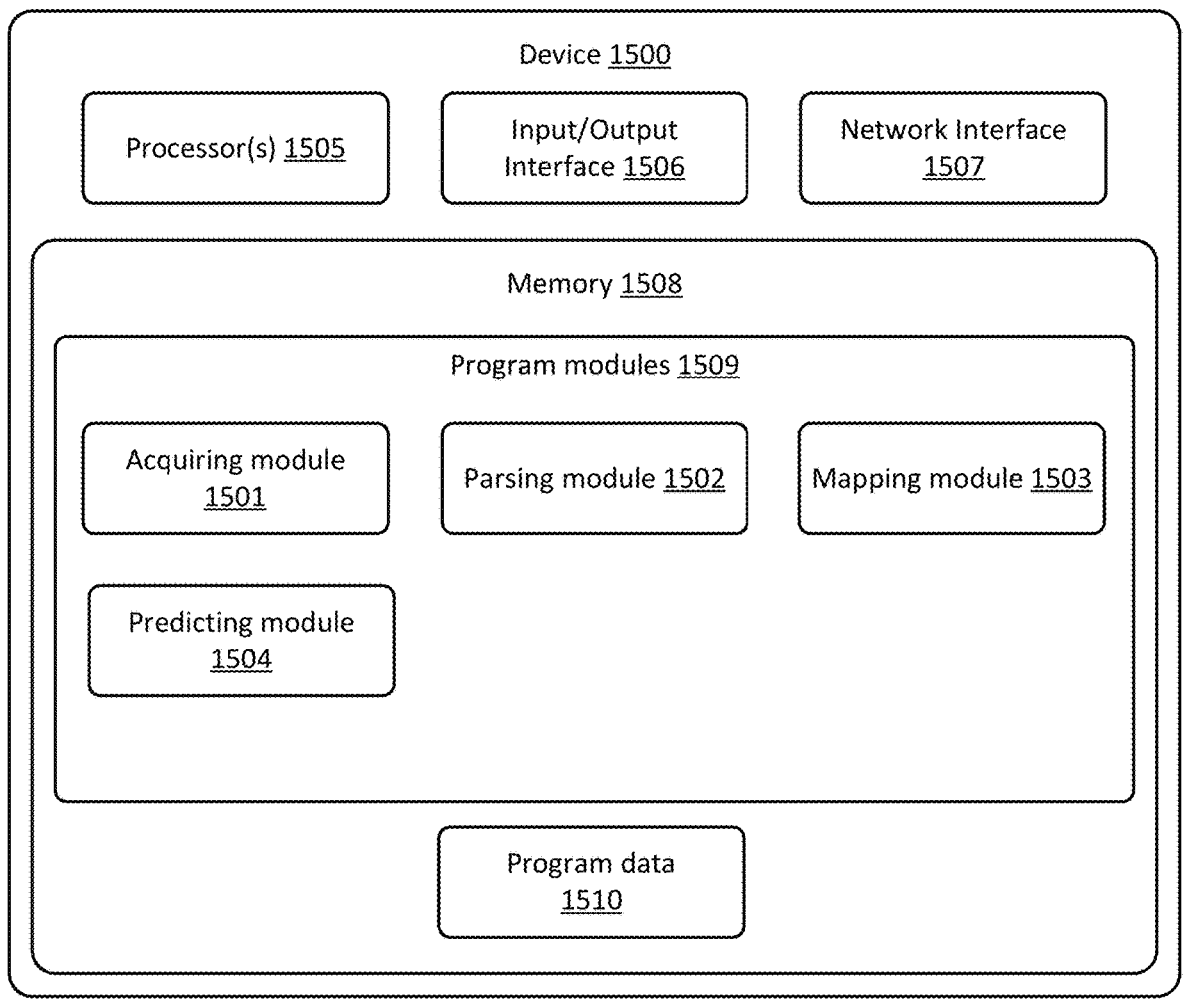
FIG. 15 is a schematic diagram of an illustrative computing device that enabled quantizing of text.

As illustrated, FIG. 15 is a schematic diagram of an illustrative computing device that enables quantizing of text. Since the implementations of the computing device is substantially similar to those of the method as described above, the following description of the implementations are merely illustrative.

The present disclosure relates to a device 1500 for quantizing text. The device 1500 may include an acquiring module 1501 configured to acquire the text to be quantized.

The device 1500 may further include a mapping module 1503 configured to acquire the word vectors corresponding to the words of the text to be translated based on a predetermined correspondence relationship between words in a source language and word vectors.

The device 1500 may further include a predicting module 1505 configured to generate the text vector of the text to be quantized based on the word vectors corresponding to the words of the text to be translated, and a predetermined text vector prediction model of the first language corresponding to a language of the text to be quantized.

In these instances, the word vectors may include word vectors capable of showing bilingual semantic information. The text vector may include a text vector capable of showing bilingual semantic information.

In implementations, the device 1500 may further include a parsing module 1502 configured to parse the text to be translated and to acquire the words of the text to be quantized.

In implementations, the device 1500 may further include one or more processors 1505, an input/output (I/O) interface 1506, a network interface 1507 and memory 1508. The memory 1508 may include a form of computer-readable media, e.g., a non-permanent storage device, random-access memory (RAM) and/or a nonvolatile internal storage, such as read-only memory (ROM) or flash RAM. The memory 1508 is an example of computer-readable media as described in the foregoing implementations. In implementations, the memory 1508 may include program modules 1509 and program data 1510. The program modules 1509 may include the acquiring module 1501, the parsing module 1502, the mapping module 1503 and the predicting module 1505 as described in the foregoing description.

Figure 16:
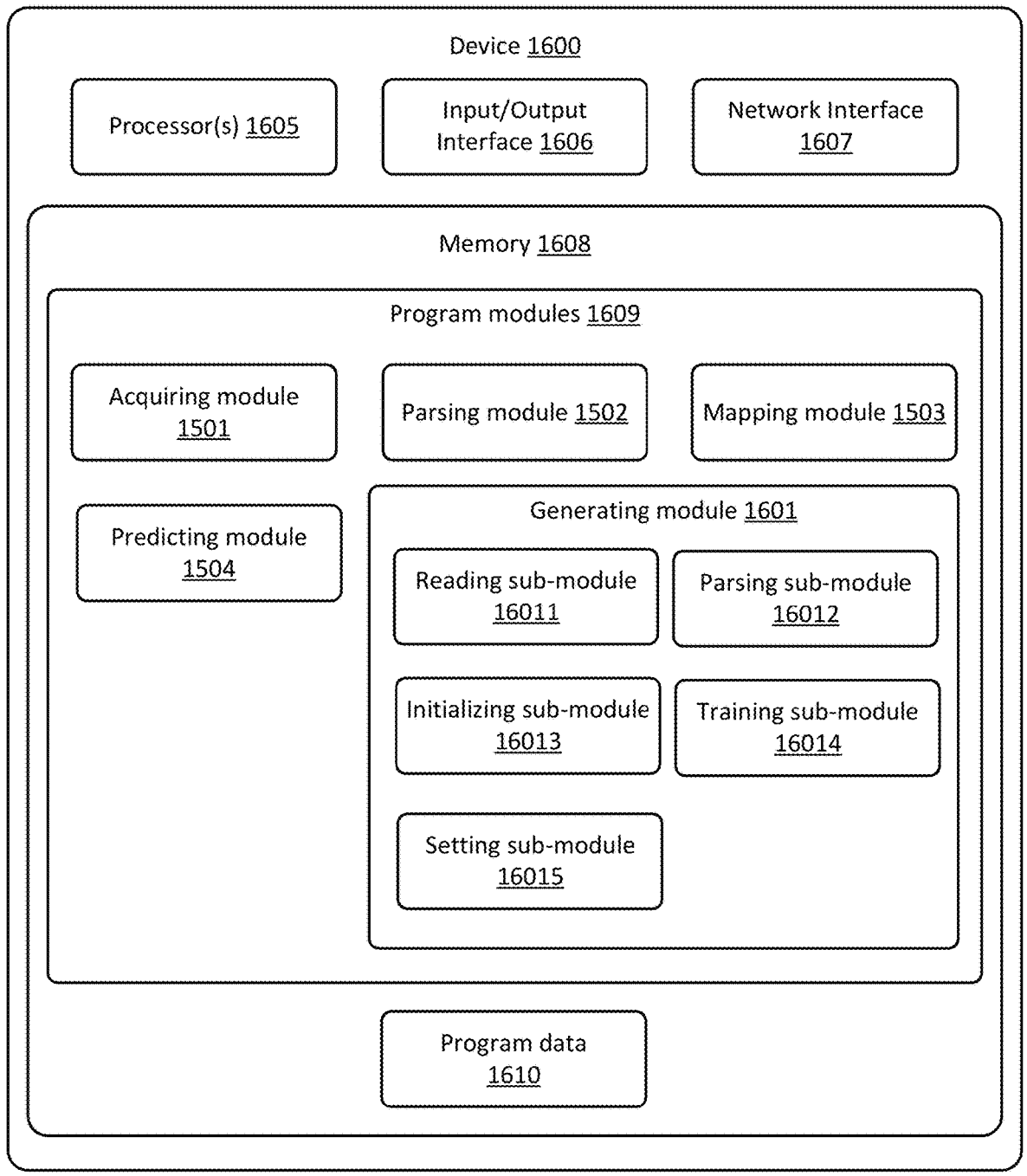
FIG. 16 is another schematic diagram of an illustrative computing device that enables quantizing of text.

As illustrated, FIG. 16 is another schematic diagram of an illustrative computing device that enables quantizing of text. In implementations, the computing device 1600 may include a generating module 1601 configured to generate a text vector prediction model of the first language.

In implementations, the generating module 1601 may include a reading sub-module 16011 configured to read a pre-stored parallel corpus and a training sub-module 16014 configured to set a training goal as to maximize average translation probabilities of sentences in the parallel corpus between the target language and the corresponding source language as background, and to train a predetermined bilingual encoding and decoding model for text vectors.

The generating module 1601 may further include a setting sub-module 16015 configured to designate an encoding part of the bilingual encoding and decoding model for text vectors, as the text vector prediction model of the first language if the language of the text to be quantized is the source language. If the language of the text to be quantized is the target language, setting sub-module 16015 may designate a reverse model of the encoding part of the trained bilingual encoding and decoding model for text vectors as the text vector prediction model of the first language.

In these instances, an input layer of the bilingual encoding and decoding model for text vectors may include words of sentences of the source language and the word vectors corresponding to the words of the sentences of the source language, and an output layer of the bilingual encoding and decoding model for text vectors may include words of sentences of the target language and word vectors corresponding to the words of the sentences of the target language. The input layer of the encoding part may include text vectors of the sentences of the source language, and the text vectors of the sentences of the source language may include the input layer of the encoding part.

In implementations, the generating module 1601 further may include a parsing sub-module 16012 configured to parse sentences in the parallel corpus, acquiring words of the source language and words of the target language in the parallel corpus.

The generating module 1601 may further include an initializing sub-module 16013 configured to set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

In implementations, the training sub-module 16014 may include a first calculating sub-module configured to traverse sentence pairs of parallel corpus sentences of the parallel corpus sentences, and to calculate translation probabilities between sentences of the target language of the sentence pairs of parallel corpus sentences and corresponding sentences in the source language as the background based on the correspondence relationship to be adjusted between the words of the source language in the parallel corpus and the word vectors, the correspondence relationship to be adjusted between the words of the target language and the word vectors, and the predetermined bilingual encoding and decoding model for text vectors.

The training sub-module 16014 may further include a second calculating sub-module configured to calculate an average value of the translation probabilities between sentences in the target language of the sentence pairs of parallel corpus sentences and corresponding sentences in the source language as the background, to be an average translation probability.

The training sub-module 16014 may further include a determining sub-module configured to determining whether the average translation probability is greater than a previous average translation probability. If the determination result is "YES", the determining sub-module may adopt an optimization algorithm, update the word vectors and the connection weights of the predetermined bilingual encoding and decoding model for text vectors, and re-traverse the sentence pairs of parallel corpus sentences of the parallel corpus sentences.

The training sub-module 16014 may further include a setting sub-module configured to designate the adjusted correspondence relationship to be adjusted between the words of the source language and the word vectors as the predetermined correspondence relationship between the words of the source language and the word vectors if the determination result is "NO" and if the language of the text to be quantized is the source language. If the language of the text to be quantized is the target language, the setting sub-module may designate the adjusted correspondence relationship to be adjusted between the words of the target language and the word vectors as the predetermined correspondence relationship between the words of the target language and the word vectors.

In implementations, the computing device 1600 may further include one or more processors 1602, an input/output (I/O) interface 1603, a network interface 1604 and memory 1605. The memory 1605 may include a form of computer-readable media, e.g., a non-permanent storage device, random-access memory (RAM) and/or a nonvolatile internal storage, such as read-only memory (ROM) or flash RAM. The memory 1605 is an example of computer-readable media as described in the foregoing implementations.

In implementations, the memory 1605 may include program modules 1606 and program data 1607. The program modules 1606 may include the acquiring module 1501, the parsing module 1502, the mapping module 1503, the predicting module 1505, the generating module 1601 (which may include one or more of the reading sub-module 16011, the parsing sub-module 16012, the initializing sub-module 16013, the training sub-module 16014 and the setting sub-module 16015) as described in the foregoing description.

Figure 17:
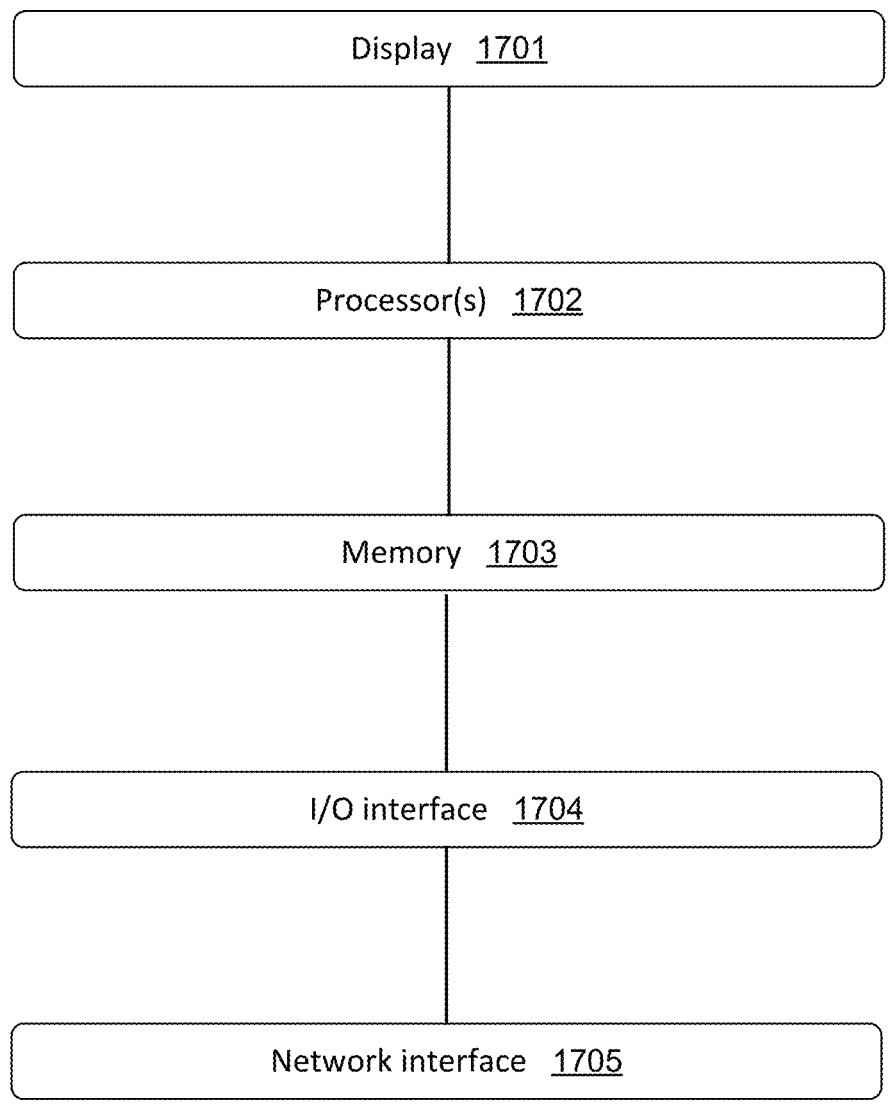
FIG. 17 is another schematic diagram of an illustrative electronic device in accordance with implementations of the present disclosure.

As illustrated, FIG. 17 is a schematic diagram of an illustrative electronic device in accordance with implementations of the present disclosure. Since the implementations of the computing device is substantially similar to those of the method as described above, the following description of the implementations are merely illustrative.

The implementations further relate to electronic devices. The electronic device may include: a display 1701, processor(s) 1702, memory 1703, an input/output interface 1704 and a network interface 1705, the memory 1703 storing instructions for generating candidate translations, when the instructions are processed by the processor(s) 1702, the device may perform the following operations. The device may acquire the text to be quantized, acquire the word vectors corresponding to the words of the text to be translated based on a predetermined correspondence relationship between words in a source language and word vectors, and generate the text vector of the text to be quantized based on the word vectors corresponding to the words of the text to be translated, and a predetermined text vector prediction model of the first language corresponding to a language of the text to be quantized. In these instances, the word vectors may include word vectors capable of showing bilingual semantic information, and the text vector may include a text vector capable of showing bilingual semantic information.

The implementations further relate to methods and devices for quantizing text using a computing device. The computing device may. acquiring the word vectors corresponding to the words of the text to be translated based on a predetermined correspondence relationship between words in a source language and word vectors, and generate a text vector of the text to be translated based on the word vectors corresponding to the words of the text to be translated, and a predetermined text vector prediction model of the first language corresponding to a language of the text to be quantized. The text vector may include a text vector capable of showing bilingual semantic information such as to achieve the effect of cross-language translations.

the implementations further relate to a method for quantizing words. The computing device may initialize a word vector for each word such that the word vector is capable of showing bilingual semantic information During learning the bilingual encoding and decoding model for text vectors.

Figure 18:
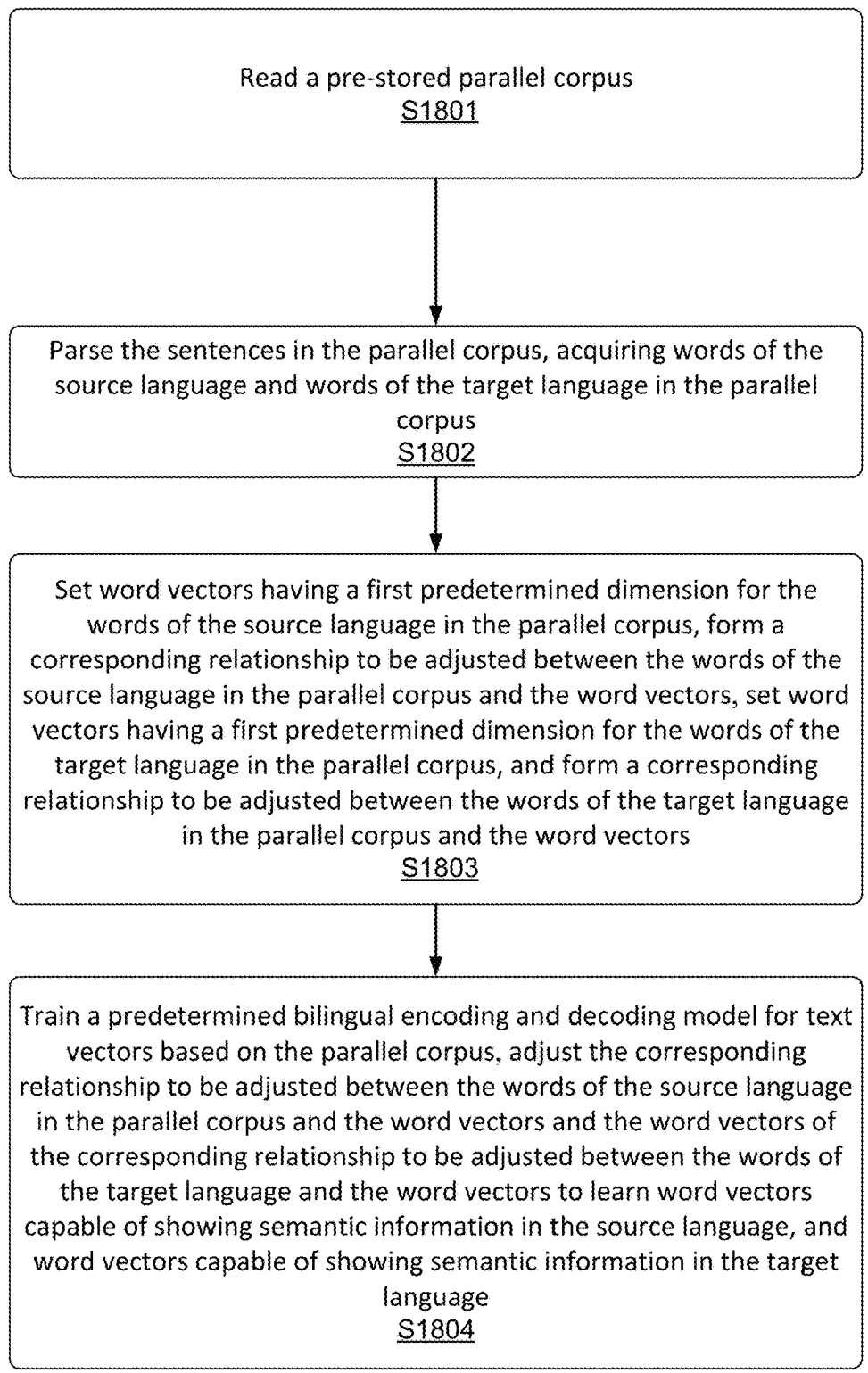
FIG. 18 is a flow chart of an illustrative process for quantizing words.

As illustrated, FIG. 18 is a flow chart of an illustrative process for quantizing words. This process is substantially similar to the processes described above, and therefore may refer to corresponding parts of the processes.

The implementations relate to a method for quantizing text using a computing device. At S1801, the computing device may read a pre-stored parallel corpus. The operation S1801 corresponds to the operation S401 as described above, and similarities are not mentioned here and related parts may be seen in description related to operation S401.

At S1802, the computing device may parse the sentences in the parallel corpus, acquiring words of the source language and words of the target language in the parallel corpus.

At S1803, the computing device may set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors. The operation S1802 and S1803 corresponds to the operation S403 as described above, and similarities are not mentioned here and related parts may be seen in description related to operation S403.

At S1804, the computing device may train a predetermined bilingual encoding and decoding model for text vectors based on the parallel corpus, adjust the correspondence relationship to be adjusted between the words of the source language in the parallel corpus and the word vectors and the word vectors of the correspondence relationship to be adjusted between the words of the target language and the word vectors to learn word vectors capable of showing semantic information in the source language, and word vectors capable of showing semantic information in the target language. The operation S 1804 corresponds to the operation S405 as described above, and similarities are not mentioned here and related parts may be seen in description related to operation S405.

In implementations, the bilingual prediction model for text vectors is a bilingual encoding and decoding model for text vectors. The operation S1804 may be implemented by the following operations.

The computing device may set a training goal as to maximize average translation probabilities of sentences in the parallel corpus between the target language and the corresponding source language as background, and the training the predetermined bilingual encoding and decoding model for the text vectors, adjust the correspondence relationship to be adjusted between the words of the source language in the parallel corpus and the word vectors and the word vectors of the correspondence relationship to be adjusted between the words of the target language and the word vectors, and acquire the word vectors capable of showing semantic information in the source language, and word vectors capable of showing semantic information in the target language.

Operation corresponds to operation S403 as described above, and similarities are not mentioned here and related parts may be seen in description related to operation S403.

In the present disclosure, an input layer of the bilingual encoding and decoding model for text vectors may include words of sentences of the source language and the word vectors corresponding to the words of the sentences of the source language, and an output layer of the bilingual encoding and decoding model for text vectors may include words of sentences of the target language and word vectors corresponding to the words of the sentences of the target language; the input layer of the encoding part may include text vectors of the sentences of the source language. The text vectors of the sentences of the source language may include the input layer of the encoding part.

Figure 19:
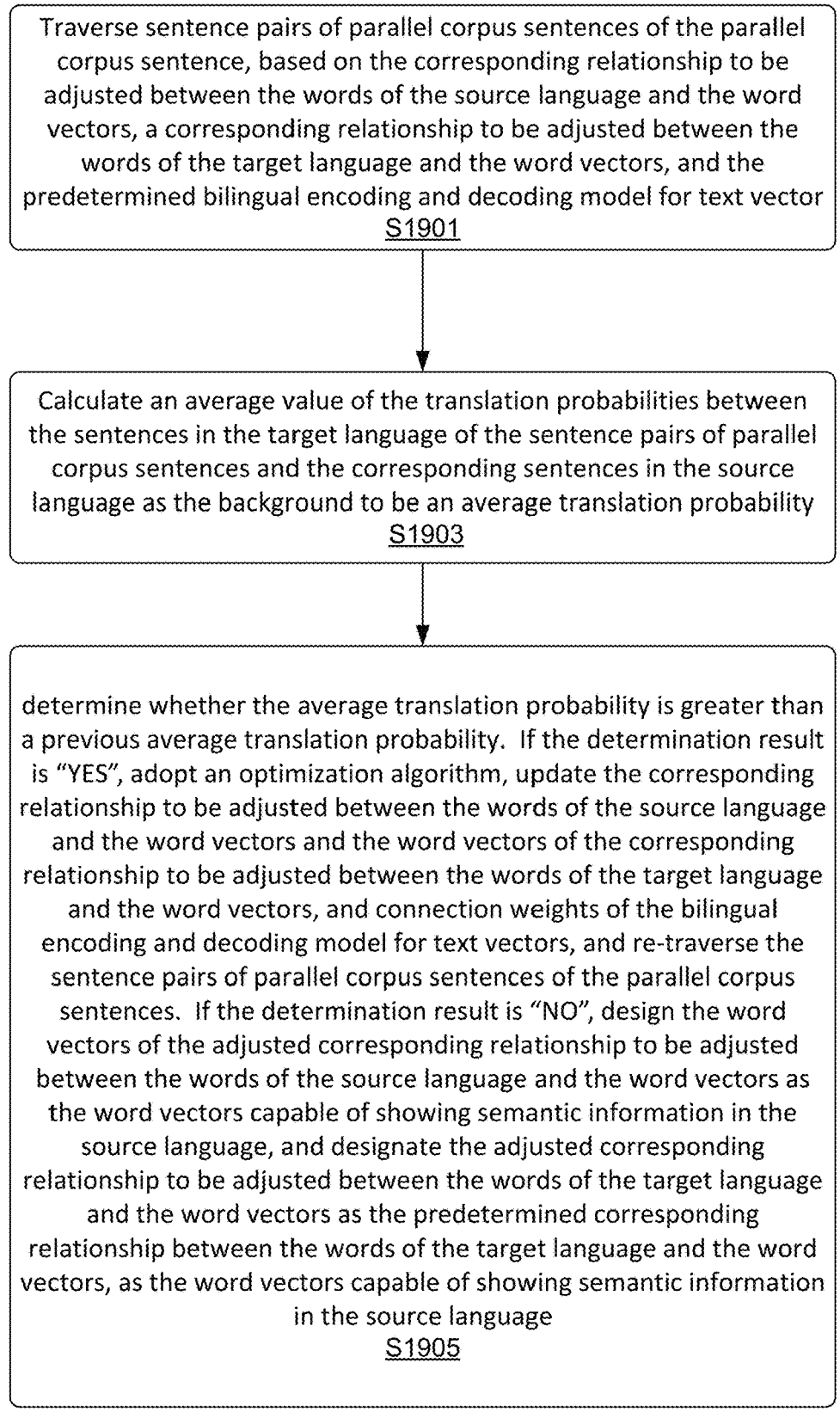
FIG. 19 is a flow chart of an illustrative process for the operation S1804 as described in FIG. 18.

As illustrated, FIG. 19 is a flow chart of an illustrative process for operation S1804 as described in FIG. 18. In implementations, operation S1804 may be implemented using a computing device by the following operations.

At S1901, the computing device may traverse sentence pairs of parallel corpus sentences of the parallel corpus sentence, based on the correspondence relationship to be adjusted between the words of the source language and the word vectors, a correspondence relationship to be adjusted between the words of the target language and the word vectors, and the predetermined bilingual encoding and decoding model for text vector. The computing device may calculate translation probabilities between sentences of the target language of the sentence pairs of parallel corpus sentences and corresponding sentences in the source language as the background.

The operation S1901 corresponds to the operation S4031 as described above, and similarities are not mentioned here and related parts may be seen in description related to operation S4031.

At S1903, the computing device may calculate an average value of the translation probabilities between the sentences in the target language of the sentence pairs of parallel corpus sentences and the corresponding sentences in the source language as the background to be an average translation probability.

Operation S1903 corresponds to operation S4033 as described above, and similarities are not mentioned here and related parts may be seen in description related to operation S4033.

At S1905, the computing device may determine whether the average translation probability is greater than a previous average translation probability. If the determination result is "YES", the computing device may adopt an optimization algorithm, update the correspondence relationship to be adjusted between the words of the source language and the word vectors and the word vectors of the correspondence relationship to be adjusted between the words of the target language and the word vectors, and connection weights of the bilingual encoding and decoding model for text vectors, and re-traverse the sentence pairs of parallel corpus sentences of the parallel corpus sentences. If the determination result is "NO", the computing device may design the word vectors of the adjusted correspondence relationship to be adjusted between the words of the source language and the word vectors as the word vectors capable of showing semantic information in the source language, and designate the adjusted correspondence relationship to be adjusted between the words of the target language and the word vectors as the predetermined correspondence relationship between the words of the target language and the word vectors, as the word vectors capable of showing semantic information in the source language.

Operation S1905 corresponds to operation S4035 as described above, and similarities are not mentioned here and related parts may be seen in description related to operation S4035.

In implementations, the optimization algorithm may include a stochastic gradient algorithm. In these instances, the adopting an optimization algorithm and updating the correspondence relationship to be adjusted between the words of the source language and the word vectors and the word vectors of the correspondence relationship to be adjusted between the words of the target language and the word vectors, and connection weights of the bilingual encoding and decoding model for text vectors may be implemented using a computing device by the following operations. 1) The computing device may calculate the correspondence relationship to be adjusted between the words of the source language and the word vectors and a gradient of the word vectors of the correspondence relationship to be adjusted between the words of the target language and the word vectors, and a gradient of the connection weights of the bilingual encoding and decoding model for text vectors based on a predetermined learning rate and an equation of the average translation probability; 2) the computing device may calculate the correspondence relationship to be adjusted between the words of the source language and the word vectors and a gradient of the word vectors of the correspondence relationship to be adjusted between the words of the target language and the word vectors, and a gradient of the connection weights of the bilingual encoding and decoding model for text vectors, and update the correspondence relationship to be adjusted between the words of the source language and the word vectors, the word vectors of the correspondence relationship to be adjusted between the words of the target language and the word vectors, and the connection weights of the predetermined bilingual encoding and decoding model for text vector.

The implementations for quantification of text have been described above. Correspondingly, the implementations further relate to a device for quantizing words, and the device corresponds to the method described above.

Figure 20:
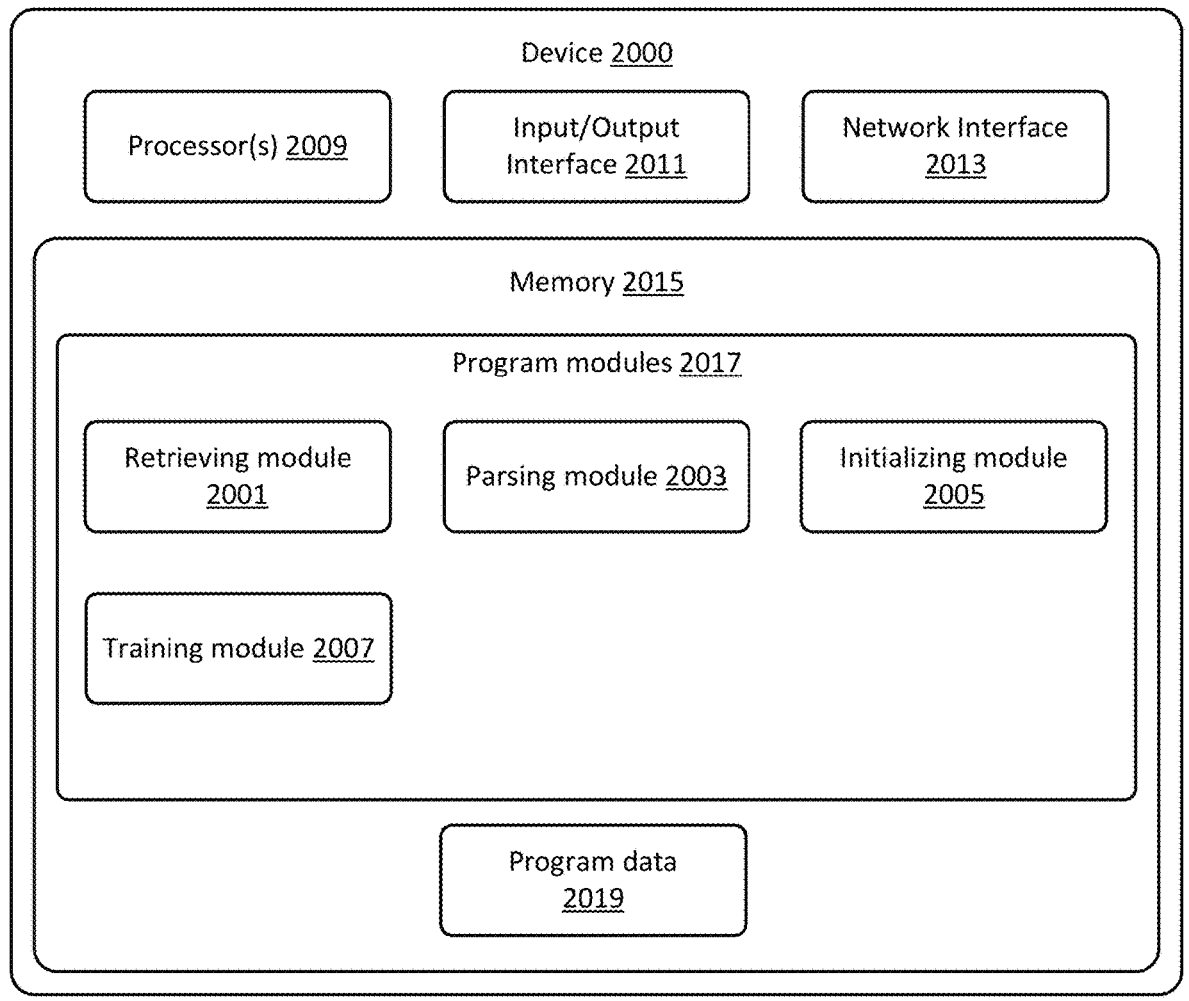
FIG. 20 is yet another schematic diagram of an illustrative computing device that enables quantizing of words.

As illustrated, FIG. 20 is a schematic diagram of an illustrative computing device that enables quantizing of words. Since the computing device of the embodiment is substantially similar to the method as described above, the following description of the implementations are merely illustrative.

The present disclosure relates to a device for quantizing text. The device 2000 may include a retrieving module 2001 configured to read a pre-stored parallel corpus, and a parsing module 2003 configured to parse sentences in the parallel corpus, acquiring words of the source language and words of the target language in the parallel corpus;

The device may further include an initializing module 2005 configured to set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of an target language in the parallel corpus and the word vectors;

The device may further include a training module 2007 configured to train a predetermined bilingual encoding and decoding model for text vectors based on the parallel corpus, and adjust the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language.

In implementations, the bilingual prediction model for text vectors is a bilingual encoding and decoding model for text vectors.

The training a predetermined bilingual encoding and decoding model for text vectors based on the parallel corpus, adjusting the correspondence relationship to be adjusted between the words of the source language in the parallel corpus and the word vectors and the word vectors of the correspondence relationship to be adjusted between the words of the target language and the word vectors to learn word vectors capable of showing semantic information in the source language, and word vectors capable of showing semantic information in the target language may be implemented using the device by the following operations.

The device may set a training goal as to maximize average translation probabilities of sentences in the parallel corpus between the target language and the corresponding source language as background, and the training the predetermined bilingual encoding and decoding model for the text vectors, adjust the correspondence relationship to be adjusted between the words of the source language in the parallel corpus and the word vectors and the word vectors of the correspondence relationship to be adjusted between the words of the target language and the word vectors, and acquire the word vectors capable of showing semantic information in the source language the word vectors capable of showing semantic information in the target language.

In these instances, an input layer of the bilingual encoding and decoding model for text vectors may include words of sentences of the source language and the word vectors corresponding to the words of the sentences of the source language, and an output layer of the bilingual encoding and decoding model for text vectors may include words of sentences of the target language and word vectors corresponding to the words of the sentences of the target language. The input layer of the encoding part may include text vectors of the sentences of the source language, the text vectors of the sentences of the source language may include the input layer of the encoding part.

In implementations, the device 2000 may further include one or more processors 2009, an input/output (I/O) interface 2011, a network interface 2013 and memory 2015. The memory 2015 may include a form of computer-readable media, e.g., a non-permanent storage device, random-access memory (RAM) and/or a nonvolatile internal storage, such as read-only memory (ROM) or flash RAM. The memory 2015 is an example of computer-readable media as described in the foregoing implementations.

In implementations, the memory 2015 may include program modules 2017 and program data 2019. The program modules 2017 may include the retrieving module 2001, the parsing module 2003, the initializing module 2005 and the training module 2007 as described in the foregoing description.

Figure 21:
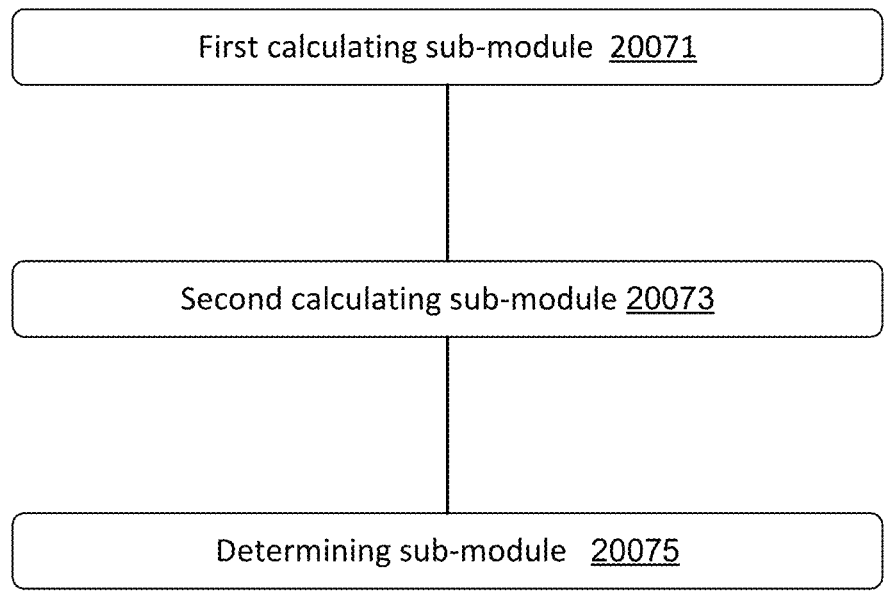
FIG. 21 is a schematic diagram of an illustrative computing module of the training module 2007 as described in FIG. 20.

As illustrated, FIG. 21 is a schematic diagram of an illustrative computing module that enable quantizing of words. In implementations, the training module 2007 may include a first calculating sub-module 20071 configured to traverse sentence pairs of parallel corpus sentences of the parallel corpus sentences, and calculate translation probabilities between sentences of the target language of the sentence pairs of parallel corpus sentences and corresponding sentences in the source language as the background based on the correspondence relationship to be adjusted between the words of the source language and the word vectors, a correspondence relationship to be adjusted between the words of the target language and the word vectors, and the predetermined bilingual encoding and decoding model for text vector.

The training module 2007 may further include a second calculating sub-module 20073 configured to calculate an average value of the translation probabilities between sentences in the target language of the sentence pairs of parallel corpus sentences and corresponding sentences in the source language as the background to be an average translation probability.

The training module 2007 may further include a determining sub-module 20075 configured to determine whether the average translation probability is greater than a previous average translation probability. If the determination result is "YES", the determining sub-module 20075 may adopt an optimization algorithm, update the correspondence relationship to be adjusted between the words of the source language and the word vectors and the word vectors of the correspondence relationship to be adjusted between the words of the target language and the word vectors, and connection weights of the bilingual encoding and decoding model for text vectors, and re-traversing the sentence pairs of parallel corpus sentences of the parallel corpus sentences.

If the determination result is "NO", the determining sub-module 20075 may design the word vectors of the adjusted correspondence relationship to be adjusted between the words of the source language and the word vectors as the word vectors capable of showing semantic information in the source language, and designate the adjusted correspondence relationship to be adjusted between the words of the target language and the word vectors as the predetermined correspondence relationship between the words of the target language and the word vectors as the word vectors capable of showing semantic information in the source language.

Figure 22:
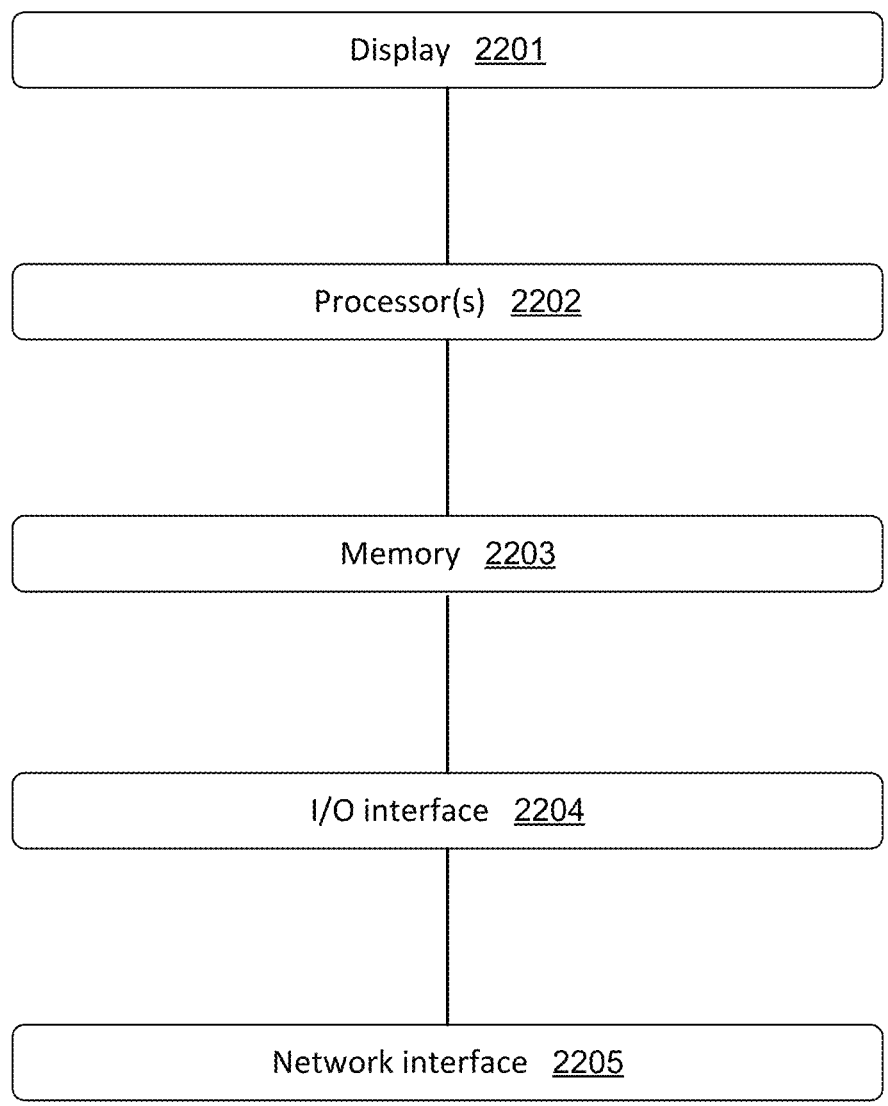
FIG. 22 is yet another schematic diagram of an illustrative electronic device in accordance with implementations of the present disclosure.

As illustrated, FIG. 22 is a schematic diagram of another illustrative electronic device in accordance with implementations of the present disclosure. Since the apparatus of the embodiment is substantially similar to the method as described above, the following description of the implementations are merely illustrative.

The implementations further relate to another electronic device. The electronic device 2200 may include: a display 2201, processor(s) 2202, memory 2203, an input/output interface 2204 and a network interface 2205, the memory 2203 storing instructions for generating candidate translations, when the instructions are processed by the processor (s) 2202, the electronic device 2200 may perform the following operations. The electronic device 2200 may read a pre-stored parallel corpus; parsing the sentences in the parallel corpus, acquiring words of the source language and words of the target language in the parallel corpus; setting word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of an target language in the parallel corpus and the word vectors. The electronic device may training a predetermined bilingual encoding and decoding model for text vectors based on the parallel corpus, and adjust the correspondence relationship to be adjusted between the words of the source language in the parallel corpus and the word vectors and the word vectors of the correspondence relationship to be adjusted between the words of the target language and the word vectors, to learn word vectors capable of showing semantic information in the source language, and word vectors capable of showing semantic information in the target language.

The implementations further relate to methods and devices for quantizing text using a computing device. The computing device may initialize a word vector for each word, form the correspondence relationship to be adjusted between the words of the source language and the word vectors and the word vectors of the correspondence relationship to be adjusted between the words of the target language and the word vectors, train a predetermined bilingual encoding and decoding model for text vectors based on the parallel corpus, adjust the correspondence relationship to be adjusted between the words of the source language in the parallel corpus and the word vectors and the word vectors of the correspondence relationship to be adjusted between the words of the target language and the word vectors such as to generate word vectors capable of having semantic information applicable to cross-language translations.

Although the present disclosure provides preferred embodiments above, it is not intended to limit the present disclosure. One of ordinary skill in the art, without departing from the spirit and scope of the present disclosure, may make possible changes and modifications. Therefore, the scope of application should be defined by the scope of the claims of the present disclosure.

In a typical configuration, a computing device includes one or more processors (CPU), input/output interfaces, network interfaces, and memory.

Memory may include computer-readable medium volatile memory, random access memory (RAM) and/or nonvolatile memory, etc., such as read only memory (ROM) or flash memory (flash RAM). Computer-readable memory medium are examples.

1. A computer-readable media includes permanent and non-permanent, removable and non-removable media that may be made in any method or technology to achieve information storage. Information can be computer-readable instructions, data structures, program modules or other data. Examples of computer storage media include, but not limited to phase-change memory (PRAM), static random access memory (SRAM), dynamic random access memory (DRAM), other types of random access memory (RAM), read only memory (ROM), electrically erasable programmable Read Only memory (EEPROM), flash memory or other memory technology, CD-ROM read-only memory (CD-ROM), digital versatile disc (DVD) or other optical storage, magnetic cassettes, magnetic disk storage or other magnetic tape storage devices, or any other magnetic non-transmission medium, which can be used to store the information for access by computing devices. Defined in accordance with this present disclosure, computer-readable media does not include non-transitory media, such as modulated data signal and carriers.

2. One skilled in the art should understand, embodiments of the present disclosure provide a method, a system, or a computer program product. Accordingly, the present disclosure may be entirely implemented by hardware, software, or a combination of hardware and software. Further, the present disclosure can be used in one or more computer usable storage media (including but not limited to optical disk storage and memory, etc.) that contain computer usable program codes and are implemented on a computer program product.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A device for quantification of text, the device comprising:
    one or more processors; and
    memory to maintain a plurality of components executable by the one or more processors, the plurality of components comprising:
    an acquiring module configured to acquire a text to be quantized;
    mapping module configured to acquire word vectors corresponding to words of the text to be translated based on a predetermined correspondence relationship between the words in a source language and the word vectors; and
    a predicting module configured to generate a text vector of the text to be quantized based on the word vectors corresponding to the words of the text to be quantized and a predetermined text vector prediction model of a first language corresponding to a language of the text to be quantized, wherein the word vectors are capable of showing bilingual semantic information, and the text vector is capable of showing bilingual semantic information.

2. The device of claim 1, wherein the plurality of components further comprise:
    a parsing module configured to parse the text to be quantized and acquire the words of the text to be quantized.

3. The device of claim 1, wherein the plurality of components further comprise:
    a generating module configured to generate the text vector prediction model of the first language.

4. The device of claim 3, wherein the generating module comprises:
    a reading sub-module configured to read a pre-stored parallel corpus;
    a training sub-module configured to:
        set a training goal as to maximize average translation probabilities of sentences in the parallel corpus between a target language and the corresponding source language as background, and train a predetermined bilingual encoding and decoding model for text vectors;

a setting sub-module configured to:

if the language of the text to be quantized is the source language, designate an encoding part of the bilingual encoding and decoding model for the text vectors as the text vector prediction model of the first language, and if the language of the text to be quantized is the target language, designate a reverse model of the encoding part of the trained bilingual encoding and decoding model for text vectors as the text vector prediction model of the first language;

wherein:

an input layer of the bilingual encoding and decoding model for text vectors comprises words of sentences of the source language and the word vectors corresponding to the words of the sentences of the source language, an output layer of the bilingual encoding and decoding model for text vectors comprises words of sentences of the target language and word vectors corresponding to the words of the sentences of the target language, the input layer of the encoding part comprises text vectors of the sentences of the source language, and the text vectors of the sentences of the source language comprise the input layer of the encoding part.

5. The device of claim 4, wherein the generating module further comprises:

a parsing sub-module configured to:

parse sentences in the parallel corpus, and acquire words of the source language and words of the target language in the parallel corpus;

an initializing sub-module configured to:

set word vectors having a first predetermined dimension for the words of the source language in the parallel corpus, form a correspondence relationship to be adjusted between the words of the source language in the parallel corpus and the word vectors, set word vectors having a first predetermined dimension for the words of the target language in the parallel corpus, and form a correspondence relationship to be adjusted between the words of the target language in the parallel corpus and the word vectors.

6. The device of claim 4, wherein the training module comprises:

a first calculating sub-module configured to:

traverse parallel corpora of sentence pairs of the parallel corpus sentences, calculate translation probabilities between sentences of the target language of the parallel corpora of sentence pairs and corresponding sentences in the source language as the background based on the correspondence relationship to be adjusted between the words of the source language in the parallel corpus and the word vectors, the correspondence relationship to be adjusted between the words of a target language and the word vectors, and the predetermined bilingual encoding and decoding model for text vectors;

a second calculating sub-module configured to calculate an average value of the translation probabilities between sentences in the target language of the parallel corpora of sentence pairs and corresponding sentences in the source language as the background to be designated as an average translation probability;

a determining sub-module configured to:

determine whether the average translation probability is greater than a previous average translation probability, in response to a determination that the average translation probability is greater than the previous average translation probability:

adopt an optimization algorithm, update the word vectors and connection weights of the predetermined bilingual encoding and decoding model for text vectors, and re-traverse the parallel corpora of sentence pairs of the parallel corpus sentences;

a setting sub-module configured to:

in response to a determination that the average translation probability is not greater than the previous average translation probability:

if the language of the text to be quantized is the source language, designate the adjusted correspondence relationship to be adjusted between the words of the source language and the word vectors as the predetermined correspondence relationship between the words of the source language and the word vectors, and if the language of the text to be quantized is the target language, designate the adjusted correspondence relationship to be adjusted between the words of the target language and the word vectors as the predetermined correspondence relationship between the words of the target language and the word vectors.

7. One or more computer-readable media storing executable instructions that, when executed by one or more processors, cause the one or more processors to perform acts comprising:

reading a pre-stored parallel corpus;

parsing sentences in the parallel corpus;

acquiring words of a source language and words of a target language in the parallel corpus;

setting word vectors having a first predetermined dimension for the words of the source language in the parallel corpus;

forming a correspondence relationship to be adjusted between the words of the source language in the parallel corpus and the word vectors;

setting word vectors having a first predetermined dimension for the words of the target language in the parallel corpus;

forming a correspondence relationship to be adjusted between the words of the target language in the parallel corpus and the word vectors;

training a predetermined bilingual encoding and decoding model for text vectors based on the parallel corpus; and adjusting the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language.

8. The one or more computer-readable media of claim 7, wherein the bilingual prediction model for text vectors is a bilingual encoding and decoding model for text vectors, and wherein training the predetermined bilingual encoding and decoding model for text vectors based on the parallel corpus and adjusting the correspondence relationship to be adjusted between the words of the source language in the parallel corpus and the word vectors and the word vectors of the correspondence relationship to be adjusted between the words of the target language and the word vectors to learn word vectors capable of showing semantic information in the source language and word vectors capable of showing semantic information in the target language are implemented by:
   setting a training goal as to maximize average translation probabilities of sentences in the parallel corpus between the target language and the corresponding source language as background and the training the predetermined bilingual encoding and decoding model for the text vectors;
   adjusting the correspondence relationship to be adjusted between the words of the source language in the parallel corpus and the word vectors and the word vectors of the correspondence relationship to be adjusted between the words of the target language and the word vectors;
   acquiring the word vectors capable of showing semantic information in the source language, the word vectors capable of showing semantic information in the target language, wherein:
   an input layer of the bilingual encoding and decoding model for text vectors comprises words of sentences of the source language and the word vectors corresponding to the words of the sentences of the source language,
   an output layer of the bilingual encoding and decoding model for text vectors comprises words of sentences of the target language and word vectors corresponding to the words of the sentences of the target language,
   the input layer of the encoding part comprises text vectors of the sentences of the source language, and
   the text vectors of the sentences of the source language comprise the input layer of the encoding part.

9. The one or more computer-readable media of claim 7, wherein the setting the training goal as to maximize average translation probabilities of the sentences in the parallel corpus between the target language and the corresponding source language as background, and training the predetermined bilingual encoding and decoding model for the text vectors, adjusting the correspondence relationship to be adjusted between the words of the source language in the parallel corpus and the word vectors and the word vectors of the correspondence relationship to be adjusted between the words of the target language and the word vectors, and acquiring the word vectors capable of showing semantic information in the source language and word vectors capable of showing semantic information in the target language comprise:
   traversing parallel corpora of sentence pairs of the parallel corpus sentence;
   calculating translation probabilities between sentences of the target language of the parallel corpora of sentence pairs and corresponding sentences in the source language as the background based on the correspondence relationship to be adjusted between the words of the source language and the word vectors, a correspondence relationship to be adjusted between the words of the target language and the word vectors, and the predetermined bilingual encoding and decoding model for text vectors;
   calculating an average value of the translation probabilities between the sentences in the target language of the parallel corpora of sentence pairs and the corresponding sentences in the source language as the background to be an average translation probability;
   determining whether the average translation probability is greater than a previous average translation probability;
   in response to a determination that the average translation probability is greater than the previous average translation probability:
   adopting an optimization algorithm,
   updating the correspondence relationship to be adjusted between the words of the source language and the word vectors and the word vectors of the correspondence relationship to be adjusted between the words of the target language and the word vectors, and connection weights of the bilingual encoding and decoding model for text vectors, and
   re-traversing the parallel corpora of sentence pairs of the parallel corpus sentences;
   in response to a determination that the average translation probability is not greater than the previous average translation probability:
   designating the word vectors of the adjusted correspondence relationship to be adjusted between the words of the source language and the word vectors as the word vectors capable of showing semantic information in the source language, and
   designating the adjusted correspondence relationship to be adjusted between the words of the target language and the word vectors as the predetermined correspondence relationship between the words of the target language and the word vectors as the word vectors capable of showing semantic information in the source language.

10. The one or more computer-readable media of claim 9, wherein adopting the optimization algorithm comprises adopting a stochastic gradient algorithm, and wherein adopting an optimization algorithm and updating the correspondence relationship to be adjusted between the words of the source language and the word vectors and the word vectors of the correspondence relationship to be adjusted between the words of the target language and the word vectors and connection weights of the bilingual encoding and decoding model for text vectors comprise:
   calculating the correspondence relationship to be adjusted between the words of the source language and the word vectors and a gradient of the word vectors of the correspondence relationship to be adjusted between the words of the target language and the word vectors, and gradients of the connection weights of the bilingual encoding and decoding model for text vectors based on a predetermined learning rate and an equation of the average translation probability; and
   updating the correspondence relationship to be adjusted between the words of the source language and the word vectors, the word vectors of the correspondence relationship to be adjusted between the words of the target language and the word vectors, and the connection weights of the predetermined bilingual encoding and decoding model for text vectors based on the correspondence relationship to be adjusted between the words of the source language and the word vectors and the gradient of the word vectors of the correspondence relationship to be adjusted between the words of the target language and the word vectors, and gradients of the connection weights of the bilingual encoding and decoding model for text vectors.

11. A method, comprising:

acquiring a text to be quantized;

acquiring word vectors corresponding to words of the text to be translated based on a predetermined correspondence relationship between the words in a source language and the word vectors; and generating a text vector of the text to be quantized based on the word vectors corresponding to the words of the text to be quantized and a predetermined text vector prediction model of a first language corresponding to a language of the text to be quantized, wherein the word vectors are capable of showing bilingual semantic information, and the text vector is capable of showing bilingual semantic information.

12. The method of claim 11, further comprising:

parsing the text to be quantized; and acquiring the words of the text to be quantized.

13. The method of claim 11, further comprising:

generating the text vector prediction model of the first language.

14. The method of claim 13, further comprising:

reading a pre-stored parallel corpus;

setting a training goal as to maximize average translation probabilities of sentences in the parallel corpus between a target language and the corresponding source language as background;

training a predetermined bilingual encoding and decoding model for text vectors;

if the language of the text to be quantized is the source language, designating an encoding part of the bilingual encoding and decoding model for the text vectors as the text vector prediction model of the first language; and if the language of the text to be quantized is the target language, designating a reverse model of the encoding part of the trained bilingual encoding and decoding model for text vectors as the text vector prediction model of the first language;

wherein:

an input layer of the bilingual encoding and decoding model for text vectors comprises words of sentences of the source language and the word vectors corresponding to the words of the sentences of the source language, an output layer of the bilingual encoding and decoding model for text vectors comprises words of sentences of the target language and word vectors corresponding to the words of the sentences of the target language, the input layer of the encoding part comprises text vectors of the sentences of the source language, and the text vectors of the sentences of the source language comprise the input layer of the encoding part.

15. The method of claim 14, further comprising:

parsing sentences in the parallel corpus, acquiring words of the source language and words of the target language in the parallel corpus;

setting word vectors having a first predetermined dimension for the words of the source language in the parallel corpus, forming a correspondence relationship to be adjusted between the words of the source language in the parallel corpus and the word vectors;

setting word vectors having a first predetermined dimension for the words of the target language in the parallel corpus; and forming a correspondence relationship to be adjusted between the words of the target language in the parallel corpus and the word vectors.

16. The method of claim 14, further comprising:

traversing parallel corpora of sentence pairs of the parallel corpus sentences;

calculating translation probabilities between sentences of the target language of the parallel corpora of sentence pairs and corresponding sentences in the source language as the background based on the correspondence relationship to be adjusted between the words of the source language in the parallel corpus and the word vectors, the correspondence relationship to be adjusted between the words of a target language and the word vectors, and the predetermined bilingual encoding and decoding model for text vectors;

calculating an average value of the translation probabilities between sentences in the target language of the parallel corpora of sentence pairs and corresponding sentences in the source language as the background to be designated as an average translation probability;

determining whether the average translation probability is greater than a previous average translation probability;

in response to a determination that the average translation probability is greater than the previous average translation probability:

adopting an optimization algorithm;

updating the word vectors and connection weights of the predetermined bilingual encoding and decoding model for text vectors; and re-traversing the parallel corpora of sentence pairs of the parallel corpus sentences;

in response to a determination that the average translation probability is not greater than the previous average translation probability:

if the language of the text to be quantized is the source language, designating the adjusted correspondence relationship to be adjusted between the words of the source language and the word vectors as the predetermined correspondence relationship between the words of the source language and the word vectors; and if the language of the text to be quantized is the target language, designating the adjusted correspondence relationship to be adjusted between the words of the target language and the word vectors as the predetermined correspondence relationship between the words of the target language and the word vectors.

* * * * *